US008816144B2

(12) United States Patent
Felix et al.

(10) Patent No.: US 8,816,144 B2
(45) Date of Patent: Aug. 26, 2014

(54) DIRECT PRODUCTION OF FRACTIONATED AND UPGRADED HYDROCARBON FUELS FROM BIOMASS

(71) Applicant: Gas Technology Institute, Des Plaines, IL (US)

(72) Inventors: Larry G. Felix, Pelhama, AL (US); Martin B. Linck, Grayslake, IL (US); Terry L. Marker, Palos Heights, IL (US); Michael J. Roberts, Itasca, IL (US)

(73) Assignee: Gas Technology Institute, Des Plaines, IL (US)

( * ) Notice: Subject to any disclaimer, the term of this patent is extended or adjusted under 35 U.S.C. 154(b) by 89 days.

(21) Appl. No.: 13/644,984

(22) Filed: Oct. 4, 2012

(65) Prior Publication Data

US 2014/0100395 A1    Apr. 10, 2014

(51) Int. Cl.
 *C07C 1/00* (2006.01)
(52) U.S. Cl.
 USPC ............................... 585/240; 585/733
(58) Field of Classification Search
 USPC ........................ 585/240, 733; 208/133–141
 See application file for complete search history.

(56) References Cited

U.S. PATENT DOCUMENTS

| 4,411,770 | A | 10/1983 | Chen et al. |
| 5,207,927 | A | 5/1993 | Marinangeli et al. |
| 5,470,486 | A | 11/1995 | Gillespie |
| 7,994,375 | B2 | 8/2011 | Marker et al. |
| 8,197,673 | B2 | 6/2012 | Khan |
| 2007/0017851 | A1 | 1/2007 | Mehra et al. |
| 2008/0159928 | A1 | 7/2008 | Kokayeff et al. |
| 2010/0251600 | A1 | 10/2010 | Marker et al. |
| 2010/0256428 | A1 * | 10/2010 | Marker et al. ................ 585/240 |
| 2011/0245551 | A1 | 10/2011 | Marker et al. |

OTHER PUBLICATIONS

International Application No. PCT/US13/62881—International Search Report dated Feb. 14, 2014.

* cited by examiner

*Primary Examiner* — Brian McCaig
(74) *Attorney, Agent, or Firm* — Banner & Witcoff, Ltd.

(57) ABSTRACT

Multistage processing of biomass to produce at least two separate fungible fuel streams, one dominated by gasoline boiling-point range liquids and the other by diesel boiling-point range liquids. The processing involves hydrotreating the biomass to produce a hydrotreatment product including a deoxygenated hydrocarbon product of gasoline and diesel boiling materials, followed by separating each of the gasoline and diesel boiling materials from the hydrotreatment product and each other.

21 Claims, 9 Drawing Sheets

DIRECT PRODUCTION OF FRACTIONATED AND UPGRADED HYDROCARBON FUELS FROM BIOMASS

GOVERNMENT RIGHTS STATEMENT

This Invention was made with government support under Contract No. DE-EE0004390 awarded by the Department of Energy. The Government has certain rights in this invention.

BACKGROUND OF THE INVENTION

1. Field of the Invention

This invention relates to an integrated process for thermochemically transforming biomass directly into fractionated and upgraded liquid fuels, particularly hydrocarbon fuels, such as gasoline and diesel boiling-point range materials, for example.

2. Description of Related Art

Conventional pyrolysis of biomass, typically fast pyrolysis, does not utilize or require $H_2$ or catalysts and produces a dense, acidic, reactive liquid product that contains water, oils, and char formed during the process. In typical pyrolysis processing, char and ash are intermingled or intermixed. Therefore, hereafter references to char are to be understood as referring to a material that includes or may include char and intermingled or intermixed ash. Because fast pyrolysis is most typically carried out in an inert atmosphere, much of the oxygen present in biomass is carried over into the oils produced in pyrolysis, which increases their chemical reactivity. The unstable liquids produced by conventional pyrolysis tend to thicken over time and can also react to a point where hydrophilic and hydrophobic phases form. Dilution of pyrolysis liquids with methanol or other alcohols has been shown to reduce the activity and viscosity of the oils, but this approach is not considered to be practical or economically viable, because large amounts of unrecoverable alcohol would be required to stabilize and transport large quantities of pyrolysis liquids.

In conventional pyrolysis carried out in an inert environment, the water miscible acidic liquid product is highly oxygenated and reactive. Conventional pyrolysis oils are characterized by total acid numbers (TAN) in the range of 100-200, low chemical stability for polymerization, incompatibility with petroleum hydrocarbons due to water miscibility, very high oxygen content, on the order of about 40% by weight, and a low heating value. As a result, the stabilization, transportation, and utilization of pyrolysis-derived liquids are problematic and it is difficult to upgrade this product to a liquid fuel due to the retrograde reactions that typically occur in conventional pyrolysis and in conventional fast pyrolysis. In addition, the separation of char generated by conventional pyrolysis from the liquid pyrolysis product presents a significant technical challenge due to the large amounts of oxygen and free radicals in the pyrolysis vapors which remain highly reactive in a vapor state and form a pitch-like material when they come in intimate contact with char particles on the surface of a barrier filter. Consequently, filters used to separate the char from the hot pyrolysis vapors tend to blind quickly due to the reactions of char and unstable oils that occur on and within the layer of separated char on the surface of the filter.

The upgrading of pyrolysis oils produced by conventional fast pyrolysis via hydroconversion consumes large quantities of $H_2$ and the extreme process conditions make it uneconomical. Also, the reactions in such processing are inherently out of balance in that, due to the high pressures required, more water is formed than the process requires while more $H_2$ is consumed than is produced by the process. This leads, in part, to a requirement for an external source of $H_2$. In a balanced process, all the hydrogen required by the process is produced by the process and water produced by the process is in large part consumed. In addition, when upgrading conventional pyrolysis oil, hydroconversion reactors often plug due to coke precursors present in the pyrolysis oils or from coke produced as a result of the catalytic hydroconversion process.

In general, hydropyrolysis is a catalytic pyrolysis process carried out in the presence of molecular hydrogen. Hydropyrolysis may be an unfortunate name in that it could be taken to be an aqueous process. However, for those skilled in the art, the process context provides sufficient clarity to avoid such misconception. Typically, the objective of conventional hydropyrolysis processes has been to maximize liquid yield in a single step. However, in one known case, a second stage reaction was added, the objective of which was to maximize hydrocarbon yield while maintaining high oxygen removal. However, even this approach compromises economy, because excessive internal pressures are required along with an external source of $H_2$.

Because of such inefficiencies, significant interest remains in the economical production of hydrocarbon fuels from biomass, particularly, gasoline and diesel boiling-point range materials.

SUMMARY OF THE INVENTION

The present invention provides a novel and compact integrated process for the direct production of fractionated liquid fuels, particularly upgraded or high-quality hydrocarbon fuels, from biomass. This process distinguishes itself from other biomass-to-fuels processes by its level of integration, process economy as established by independent life-cycle and techno-economic analyses, wide range of feed stocks, and finished product quality.

In accordance with one aspect, a process for directly producing fractionated and upgraded hydrocarbon fuels from biomass is provided wherein the biomass is hydrotreated at hydrotreatment reaction conditions to produce a hydrotreated product that includes a substantially or completely deoxygenated hydrocarbon product including gasoline and diesel boiling-point range materials. The hydrotreatment processing involves hydropyrolyzing the biomass in a reactor, preferably a bubbling fluid-bed reactor, containing molecular hydrogen and a deoxygenating and hydrogen addition catalyst at hydropyrolysis reaction conditions to produce a substantially or completely deoxygenated hydrocarbon hydropyrolysis product comprising char and vapors. As with pyrolysis and fast pyrolysis, in hydropyrolysis, char and ash are typically intermingled or intermixed. Therefore, hereafter references to char produced in hydropyrolysis are to be understood as generally referring to a material that includes or may include both char and intermixed or intermingled ash. Deoxygenated hydrocarbons are nonreactive even when adsorbed on char and thus char can be easily separated from gasoline and diesel boiling-point range vapors by conventional barrier filtration, or via other forms of gas-particle separation technologies such as known to those skilled in the art. Subsequently, all or at least a substantial portion of the char is separated from the deoxygenated hydrocarbon hydropyrolysis product to produce a char and particle-free hydropyrolysis product. The hydrotreated product is then processed to separate and upgrade each of the gasoline and diesel boiling-point range fractions from the hydrotreated product and each other.

According to further specific and particular embodiments, suitable processing for the direct production of fractionated and upgraded hydrocarbon fuels from biomass may include one or more of the following aspects:

a make-up port for introducing fresh, used, or rejuvenated catalyst into the reactor and located at a convenient point along the length of the reactor, usually, but not necessarily in the lower part of the reactor;

at least one of the separated gasoline and diesel boiling-point range materials is further chemically and/or catalytically upgraded;

the separated gasoline boiling-point range fraction is catalytically upgraded at catalytic gasoline upgrade conditions to form an upgraded gasoline product;

the separated diesel boiling-point range fraction is treated to produce an ultra-low sulfur diesel product;

the treatment of the separated diesel boiling-point range fraction to produce an ultra-low sulfur diesel product involves treating the separated diesel boiling-point range fraction in an ultra-low sulfur diesel trickle-bed reactor;

where treatment via an ultra-low sulfur diesel trickle-bed reactor produces a product stream that includes primarily ultra-low sulfur diesel and some residual gasoline, the process additionally involves separating at least a portion of the residual gasoline from the ultra-low sulfur diesel;

the hydrotreatment product additionally includes gaseous and water fractions that are separated therefrom;

the gasoline boiling-point range fraction and the gaseous fraction are separated together from the hydrotreatment product and are subjected to catalytic gasoline upgrading at catalytic gasoline upgrade conditions to form a catalytic gasoline upgrade product including catalytically upgraded gasoline and a gaseous fraction, with the process further additionally involving separating the gaseous product from the catalytically upgraded gasoline;

separating hydrogen from the catalytic gasoline upgrade product prior to separation of other gaseous components therefrom;

separating the gaseous product from the catalytically upgraded gasoline involves processing said catalytic gasoline upgrade product via a sorbent bed effective to absorb the catalytically upgraded gasoline;

separating the gaseous product from the catalytically upgraded gasoline involves processing the catalytic gasoline upgrade product via a hydrocarbon adsorber to produce a gaseous effluent stream and a gasoline-rich stream;

the hydrotreating further includes hydroconverting the char and particle-free hydropyrolysis product in a hydroconversion reactor using a hydroconversion catalyst at hydroconversion reaction conditions to produce the deoxygenated hydrocarbon product including gasoline and diesel boiling-point range fractions;

at least a portion of the separated diesel boiling-point range fraction is added to the char and particle-free hydropyrolysis product; and at least a portion of the separated diesel boiling fraction is recirculated to the hydropyrolysis reactor.

A process for directly producing fractionated and upgraded hydrocarbon fuels from biomass in accordance with another aspect involves hydropyrolyzing biomass in a reactor vessel containing molecular hydrogen and a deoxygenating and hydrogen addition catalyst. Such hydropyrolysis produces a hydropyrolysis product including a hydropyrolysis gas comprising $CO_2$, CO and $C_1$-$C_3$ gases, a partially deoxygenated hydropyrolysis liquid, water and char. As catalyst within the reactor is depleted by attrition or deactivation, provision is made for adding a make-up stream of fresh, used, or rejuvenated catalyst located at a convenient point along the length of the reactor, usually, but not necessarily in the lower part of the reactor. All or at least a substantial portion of the char is subsequently removed from at least the partially deoxygenated hydropyrolysis liquid to form a substantially char and particle-free partially-deoxygenated hydropyrolysis liquid. The substantially char and particle-free partially-deoxygenated hydropyrolysis liquid is hydroconverted in a hydroconversion reactor vessel using a hydroconversion catalyst in the presence of the hydropyrolysis gas to produce a deoxygenated and hydrogenated hydrocarbon liquid including gasoline and diesel boiling-point range fractions, a gaseous mixture comprising CO, $CO_2$, light hydrocarbon gases ($C_1$-$C_3$) and water. At least a portion of the gaseous mixture is steam reformed using water produced in at least one of the hydropyrolysis and hydroconversion steps to produce reformed molecular hydrogen. At least a portion of the reformed molecular hydrogen is subsequently introduced into the reactor vessel. Each of the gasoline and diesel boiling-point range fractions is separated from the deoxygenated hydrocarbon liquid and each other.

As used herein, the term "biomass" refers to biological material derived from living or deceased organisms and includes lignocellulosic materials, such as wood, residues from forest and agricultural lands, aquatic materials, such as algae, aquatic plants, seaweed, and animal by-products and wastes, such as offal, fats, and sewage sludge, or any combination of these or other forms of biomass. In one aspect, this invention relates to a multi-stage hydropyrolysis process for the direct production of a variety of high-quality liquid fuels, particularly upgraded hydrocarbon fuels, from biomass.

As used herein, references to the separation or removal of "substantially all" of a specifically identified material or component and corresponding references to a product or stream "substantially free" of a specifically identified material or component are to be understood to generally correspond to the removal of at least 95 percent, preferably at least 99% of the specifically identified material or component such that less than 5%, preferably less than 1% of such specifically identified material or component remains. Those skilled in the art and guided by the teachings herein provided will appreciate that references to the separation or removal of "substantially all" of a specifically identified material or component and correspondingly a product or stream "substantially free" of a specifically identified material or component, in at least some particular embodiments, refers to such a product or stream as having no more than trace or residual amounts of the specifically identified material or component.

Likewise, as used herein, references to the separation or fractionation of "gasoline" and "diesel" boiling-point range products from a substantially char and particle-free partially-deoxygenated hydropyrolysis liquid does not refer to the production of two simple fractions of the liquid hydrocarbons produced in this process that are not subsequently modified by practices familiar to those skilled in that art into finished gasoline and diesel fuels. Thus, by following the method taught herein, those skilled in the art will realize that other fractions could be isolated and finished into, for example, kerosene and jet-fuel.

Further, as used herein the terms "ULSD" and "ultra-low sulfur diesel" are used to describe diesel fuel with substantially lowered sulfur content. As of 2006 and 2007, almost all of the petroleum-based diesel fuel available in Europe and North America is of a ULSD type. As used herein and currently in the United States, the allowable sulfur content for ULSD is 15-ppmw.

Other objects and advantages will be apparent to those skilled in the art from the following detailed description taken in conjunction with the appended claims and drawings.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

FIGS. 1-9 show various preferred embodiments of the subject invention.

Figure 1:
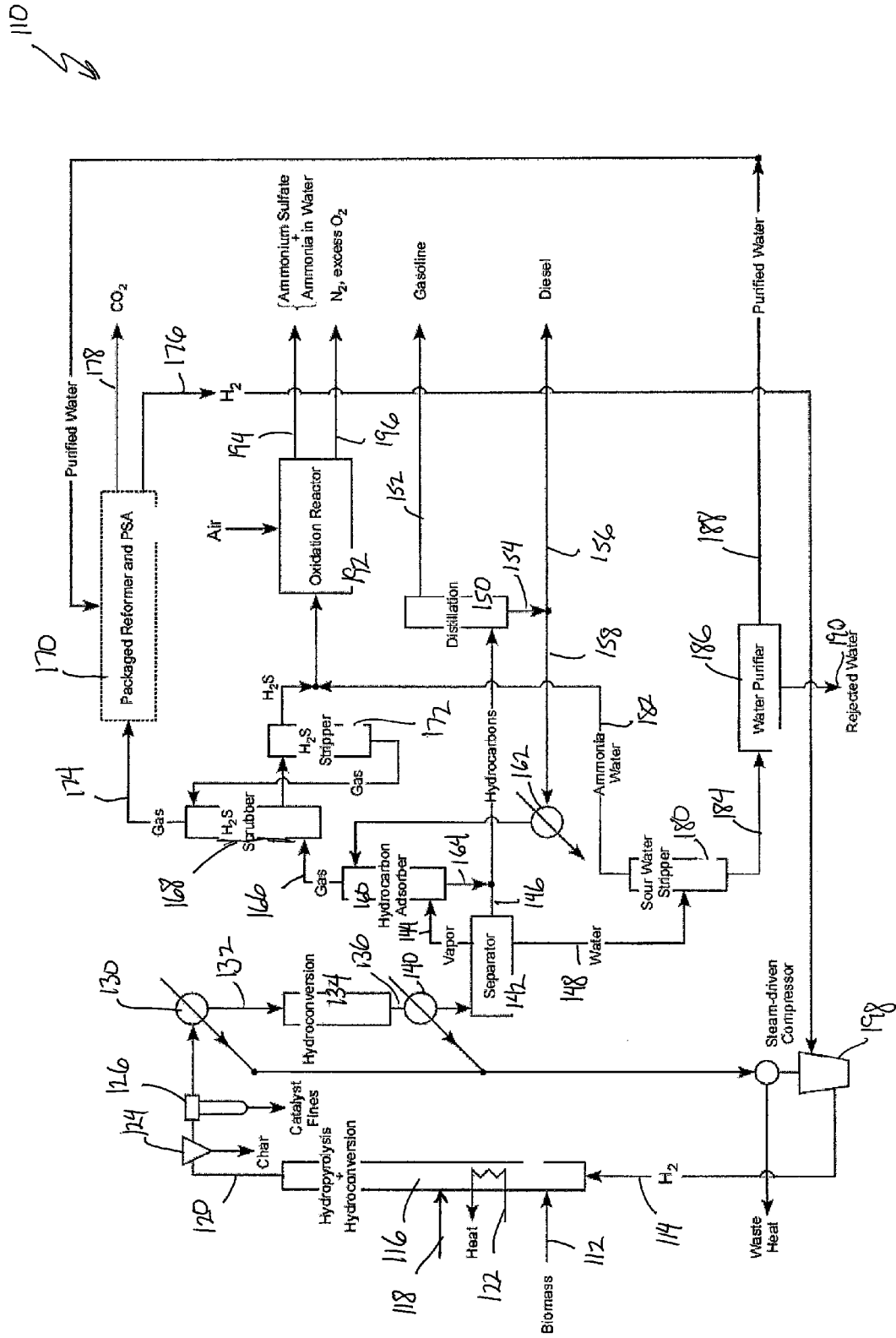
FIG. 1 is a schematic flow diagram of a process for producing hydrocarbon fuels from biomass in accordance with one embodiment of the invention and involving fractional distillation of hydrocarbons.

FIG. 1 shows a schematic flow diagram, illustrating a process of the present invention in one of its simpler forms. Unless otherwise specifically noted, it is to be understood that in this and the following described schematic process flow diagrams, similar streams and component parts, including streams and component parts not specifically called out in subsequent diagrams, are generally numbered utilizing the same last two numerical digits but with the first numerical digit varying dependent on the particular figure.

The process shown in FIG. 1 is generally designated by the reference numeral 110 and is a process for producing hydrocarbon fuels from biomass in accordance with one embodiment of this invention. As more fully described below, the process shown in FIG. 1 involves modifications to the process, shown and/or described in one or more of the following U.S. patent application Ser. No. 12/419,535, filed 7 Apr. 2009; Ser. No. 12/685,352, filed 11 Jan. 2010; Ser. No. 13/089,010, filed 18 Apr. 2011; and Ser. No. 13/196,645, filed 2 Aug. 2011, such as to provide for fractional distillation of product hydrocarbons. The disclosures of each of these prior applications are hereby incorporated by reference herein and made a part hereof, including but not limited to any portions of these applications which specifically appear hereinafter.

The process 110 shown in FIG. 1 is a compact, balanced, integrated, multi-stage process for thermochemically transforming biomass to produce or form a gasoline liquid product and a diesel liquid product suitable for use as a transportation fuel without the need for externally provided process heating, $H_2$, $CH_4$, or water. Indeed, water is one product of the process so that an excess of water beyond that required for the process is produced. Thus, FIG. 1 shows that a water stream produced by the process is purified and the purified water stream is directed to a packaged steam reformer-PSA/MSS unit 170, described more fully below, while unneeded process water is rejected. As will be appreciated by one skilled in the art and guided by the teachings herein provided, should a greater amount of purified water or potable water be required, such additional water can be obtained from the rejected water stream by appropriate treatment.

An important aspect of the invention is that the heat energy required in the process is supplied by the heat of reaction of the deoxygenation reaction, which is exothermic, occurring in both the first and second stages, 116 and 134. Another key aspect of the invention is that the biomass feed need not be severely dried and, in fact, the addition of water either in the feed or as a separate feed can be advantageous to the process because it enhances in-situ $H_2$ formation through a water-gas-shift reaction.

The first reaction stage or step of this process employs a pressurized, catalytically-enhanced, reactor vessel to create a partially or substantially deoxygenated, hydropyrolysis liquid product and char. In this first step of the process 110, biomass (such as via a stream 112) and molecular hydrogen (such as via a stream 114) are introduced into a reactor vessel 116 containing a deoxygenation catalyst and in which vessel the biomass undergoes hydropyrolysis and hydroconversion, to produce an output stream 120 comprising an at least partially deoxygenated, hydropyrolysis liquid product, pyrolysis vapors ($C_1$-$C_3$ gases), $H_2O$, CO, $CO_2$, $H_2$, and char. The reactor vessel 116 is provided with a make-up port 118, located at a convenient location along the length of the reactor, usually, but not necessarily in the lower part of the reactor providing a site where fresh, used, or rejuvenated catalyst can be added to the reactor to replace catalyst that has been attrited or eluted from the reactor.

Although any reactor vessel suitable for hydropyrolysis and hydroconversion may be employed, a preferred reactor vessel employs a fluidized bed reactor. The hydropyrolysis step employs a rapid (greater than about 550° C./min) heating of the biomass feed such that the residence time of the pyrolyzed vapors in the reactor vessel is less than about 5 minutes. In contrast thereto, the residence time of the char is relatively long because it is not removed through the bottom of the reactor vessel and, thus, must be reduced in particle size until the particles are sufficiently small to enable them to be carried out with the vapors exiting proximate the top of the reactor vessel.

The biomass feed utilized in the process of the invention may be in the form of loose biomass particles having a majority of particles preferably less than about 3 mm in size or in the form of a biomass/liquid slurry. However, it will be appreciated by those skilled in the art that the biomass feed may be pretreated or otherwise processed in a manner such that larger particle sizes can be accommodated. Suitable means for introducing the biomass feed into the reactor vessel include, but are not limited to, an auger, fast-moving (greater than about 5 m/sec) stream of carrier gas, such as inert gases and $H_2$, positive-displacement pumps, impellers, or turbine pumps.

Hydropyrolysis is typically carried out in the reactor vessel at a temperature in the range of about 425° C. to about 550° C. and a pressure in the range of about 100 psig to about 800 psig. The heating rate of the biomass is preferably greater than about 5500° C./min. The weight hourly space velocity (WHSV) in gm biomass/gm catalyst/hr for this step is typically in a range of about 0.2 to about 10. In conventional hydropyrolysis processes, the objective is to maximize liquid product yield, which requires operation at substantially higher pressures, e.g., 2000 psig. This is because decarboxylation is favored at lower pressures whereas hydrodeoxygenation is favored at higher operating pressures. By maintaining pressures in the process of this invention in the range of 100 to 800 psig, most preferably at about 500 psig, decarboxylation and dehydrodeoxygenation are balanced, but liquid product yield is reduced. At higher pressures, hydrodeoxygenation is favored and the reactions become unbalanced.

As previously indicated, in the hydropyrolysis step of the invention, the solid biomass feed is rapidly heated, preferably in a hot fluidized bed, resulting in liquid product yields comparable to and possibly better than yields obtained with conventional fast pyrolysis. However, the resulting hydropyrolysis vapors of the invention are typically in the presence of a catalyst and a high partial pressure of $H_2$ within the fluidized bed, which provides hydrogenation activity and also some deoxygenation activity, depending on the activity of the catalytically-active material in the fluidized bed. Hydrogenation activity is very desirable for preventing reactive olefins from polymerizing, thereby reducing the formation of unstable free radicals. Similarly, deoxygenation activity is important so that the heat of reaction from hydropyrolysis is supplied by the exothermic deoxygenation reaction, thereby obviating the need for external heating. An advantage of hydropyrolysis as taught by this invention over existing pyrolytic processes is that hydropyrolysis as taught by this invention avoids the retrograde reactions of pyrolysis, which are usually carried out in an inert atmosphere, most certainly in the absence of $H_2$ and usually in the absence of a catalyst, thereby promoting the undesirable formation of polynuclear aromatics, free radicals and olefinic compounds that are not present in the original biomass.

The first stage hydropyrolysis step of this invention operates at a temperature hotter than is typical of a conventional hydroconversion process, as a result of which the biomass is rapidly devolatilized. Thus, this step requires an active catalyst to stabilize the hydropyrolysis vapors, but not so active that it rapidly cokes. Catalyst particles sizes are preferably greater than about 100 μm. Although any deoxygenation catalyst suitable for use in the temperature range of this process may be employed in the hydropyrolysis step, catalysts in accordance with preferred embodiments of this invention are as follows:

Glass-ceramics catalysts—Glass-ceramics catalysts are extremely strong and attrition resistant and can be prepared as thermally impregnated (i.e., supported) or as bulk catalysts. When employed as a sulfided NiMo, Ni/NiO, or Co-based glass-ceramic catalyst, the resulting catalyst is an attrition resistant version of a readily available, but soft, conventional NiMo, Ni/NiO, or Co-based catalyst. Glass-ceramic sulfided NiMo, Ni/NiO, or Co-based catalysts are particularly suitable for use in a hot fluidized bed because these materials can provide the catalytic effect of a conventional supported catalyst, but in a much more robust, attrition resistant form. In addition, due to the attrition resistance of the catalyst, the biomass and char are simultaneously ground into smaller particles as hydropyrolysis reactions proceed within the reaction vessel. Thus, the char that is ultimately recovered is substantially free of catalyst contaminants from the catalyst due to the extremely high strength and attrition resistance of the catalyst. The attrition rate of the catalyst will typically be less than about 2 weight % per hour, preferably less than 1 weight % per hour as determined in a standard, high velocity jet cup attrition test index test.

Nickel phosphide catalyst—Ni Phosphide catalysts do not require sulfur to work and therefore will be just as active in a sulfur-free environment as in an environment containing $H_2S$, COS and other sulfur-containing compounds. Therefore, this catalyst will be just as active for biomass which has little or no sulfur present as with biomass which does contain sulfur (e.g., corn stover). This catalyst may be impregnated on carbon as a separate catalyst or impregnated directly into the biomass feedstock itself.

Bauxite—Bauxite is an extremely cheap material and, thus, may be used as a disposable catalyst. Bauxite may also be impregnated with other materials such as Ni, Mo, or be sulfided as well.

Small size spray-dried silica-alumina catalyst impregnated with NiMo or CoMo and sulfided to form a hydroconversion catalyst—commercially available NiMo or CoMo catalysts are normally provided as large size ⅛-1/16-inch tablets for use in fixed or ebullated beds. In the instant case, NiMo is impregnated on spray dried silica alumina catalyst and used in a fluidized bed. This catalyst exhibits higher strength than a conventional NiMo or CoMo catalyst and would be of an appropriate size for use in a fluidized bed.

Because the process of catalytically-enhanced hydropyrolysis is exothermic, the process 110 includes means, e.g., a heat exchanger 122 (which, depending on process requirements may be optional), for removing excess heat from the reactor 116.

The output process stream 120 is treated to remove char and particles therefrom. In the past, char removal has been a major barrier in conventional fast pyrolysis because the char tends to coat filters and react with oxygenated pyrolysis vapors to form viscous coatings which can blind hot process filters. Char may be removed in accordance with the process of the invention by filtration from the vapor stream, or by way of filtering from a wash step-ebullated bed. Backpulsing may be employed in removing char from filters, as long as the hydrogen used in the process of this invention sufficiently reduces the reactivity of the pyrolysis vapors to allow effective backpulsing. Electrostatic precipitation, inertial separation, magnetic separation, or a combination of these technologies may also be used to remove char and ash particles from the hot vapor stream before cooling and condensation of the liquid product.

By virtue of their resistance to attrition, glass-ceramics catalysts are typically more easily separated from char by energetic inertial separation technologies that employ impaction, interception, and/or diffusion processes sometimes combined with electrostatic precipitation to separate, concentrate, and collect char into a secondary stream for recovery. An additional virtue of these materials is that, because they are amenable to magnetic separation (in a reduced state, Fe and Ni being attracted to a permanent or electrically-induced magnetic field), magnetic techniques as well as combinations of magnetic, inertial, and electrostatic means may be employed for separating char from these catalysts that are not possible with softer materials.

In accordance with one embodiment of the invention, hot gas filtration may be used to remove the char and particles. In this case, because the hydrogen has stabilized the free radicals and saturated the olefins, the dust cake caught on the filters has been found to be more easily separated from the filter element than char removed in the hot filtration of the aerosols produced in conventional fast pyrolysis. In accordance with another embodiment of this invention, the char is removed by bubbling first stage product gas through a recirculating liquid. The recirculated liquid used is the high boiling point portion of the finished oil from this process and is thus a fully saturated (hydrogenated), stabilized oil having a boiling point typically above 350° C. Char or catalyst fines from the first reaction stage are captured in this liquid. A portion of the liquid may be filtered to remove the fines and a portion may be recirculated back to the first stage hydropyrolysis reactor. One advantage of using a recirculating liquid is that it provides a way to lower the temperature of the char-laden process vapors from the first reaction stage to the temperature desired for the second reaction stage hydroconversion step while removing fine particulates of char and catalyst. Another advantage of employing liquid filtration is that the use of hot gas filtration with its attendant, well-documented problems of filter cleaning is completely avoided.

In accordance with one embodiment of this invention, large-size NiMo or CoMo catalysts, deployed in an ebullated bed, are used for char removal to provide further deoxygenation simultaneous with the removal of fine particulates. Particles of this catalyst should be large, preferably about ⅛-1/16 inch in size, thereby rendering them easily separable from the fine char carried over from the first reaction stage, which is typically less than 200 mesh (about 70 micrometers).

As shown, the output process stream 120 is passed to and through an optional char separator 124, a barrier filter 126 (such as to remove catalyst fines) and a process heat exchanger 130 which may be employed to produce process steam. The char and particle-free product stream 132 passes from the heat exchanger 130 to a second reaction stage that employs a hydroconversion reactor vessel 134 in which a hydroconversion step is carried out to complete deoxygenation and hydrogenation of the hydrocarbon product received from the hydropyrolysis reactor 116.

In the hydroconversion reactor vessel 134, the second reaction stage hydroconversion step is preferably carried out at a lower temperature (250-450° C.) than the first reaction stage hydropyrolysis step to increase catalyst life and at substantially the same pressure (100-800 psig) as the first reaction stage hydropyrolysis step. The weight hourly space velocity (WHSV) for this step is in the range of about 0.2 to about 3. The catalyst used in this step is preferably protected from Na, K, Ca, P, and other metals present in the biomass which can poison the catalyst, which will tend to increase catalyst life. This catalyst also should be protected from olefins and free radicals by the catalytic upgrading carried out in the first reaction stage step. Catalysts typically selected for this step are high activity hydroconversion catalysts, e.g., sulfided NiMo and sulfided CoMo catalysts. In this reaction stage, the catalyst is used to catalyze a water-gas-shift reaction of $CO+H_2O$ to make $CO_2+H_2$, thereby enabling in-situ production of hydrogen in the second stage reactor vessel 134, which, in turn, reduces the hydrogen required for hydroconversion. NiMo and CoMo catalysts both catalyze the water-gas-shift reaction. The objective in this second reaction stage is once again to balance the deoxygenation reactions. This balancing is accomplished by using relatively low hydrogen partial pressures (100-800 psig) along with the right choice of catalyst. In conventional pyrolysis oil hydrodeoxygenation processes, hydrogen partial pressures in the range of about 2000 psig to about 3000 psig are typically employed. This is because the processes are intended to convert pyrolysis oils, which are extremely unstable and difficult to process at lower partial pressures of $H_2$.

The completely deoxygenated product passes, as a stream 136, from the second reaction stage 134 through a second process heat exchanger 140 (which can also be used to produce process steam and which, depending on process requirements, may be optional) and to a high-pressure separator 142 to form, produce, or separate the process stream into a gas (designated as vapors) fraction 144, hydrocarbon fraction 146 and a water fraction 148.

The hydrocarbons exiting the high-pressure separator 142 are directed to a distillation column 150 which separates the hydrocarbons into a gasoline fraction 152 and a diesel fraction 154.

The nominal diesel product stream 154 exiting the distillation column 150 is split, with a portion forming a diesel output stream 156 and another portion 158 being passed back to the top of a hydrocarbon adsorber 160 after having been passed through heat exchanger 162 (which depending on process requirements may be optional).

The vaporous stream 144 exiting the high-pressure separator 142 is directed to the bottom of the hydrocarbon adsorber 160 so that the hydrocarbon adsorber 160 receives two streams, one emanating from the high-pressure separator 142 and the other emanating from the distillation column 150 and subsequently passing through the heat exchanger 162 (which again depending on process requirements may be optional). The hydrocarbon adsorber 160 also has two outputs. One output stream 164 (separated hydrocarbons stream) joins the hydrocarbons output of the high-pressure separator 142 and is directed to the distillation column 150, as mentioned above. The other output is primarily gaseous and exits the top of the hydrocarbon adsorber 160 as a stream 166 and is directed such as to an $H_2S$ scrubber 168, as described further below.

The vapor stream 144 typically contains non-condensable hydrocarbon vapors (such as methane, ethane, propane and butane), other non-condensable vapors ($CO_2$, CO, and $H_2$), and depending on the efficiency of the high pressure separator 142, some $H_2S$ and $NH_3$ vapors.

These gases (typically include one or more of CO, $CO_2$, $CH_4$, ethane, and propane) are sent to the package stream reformer and PSA/MSS unit 170 together with water from the process for conversion into $H_2$ and $CO_2$. A portion of these gases are burned in a furnace or other combustor to heat up the remaining portion of gases to the operating temperature of the steam reformer, about 925° C. Steam reformers typically require a 3/1 steam-to-hydrocarbon ratio in their feed to push the reaction equilibrium, but this is far more than the amount required for reaction. The steam is recovered and recycled inside the steam reformer. The $CO_2$ is removed from the process by pressure swing adsorption (PSA), a suitable membrane separation system (MSS), or by other means known to those skilled in the art of separating $H_2$ from a mixture of gases and the $H_2$ is recirculated back to the first reaction stage (hydropyrolysis) of the process.

In addition, this process is preferably balanced with respect to water so that enough water is made in the process to provide all the water needed in the steam reforming step. In accordance with one embodiment of this invention, the amount of water employed is such that the overall process output contains substantially only $CO_2$ and liquid hydrocarbon products, thereby avoiding an additional process step for excess water disposal. It will be appreciated by those skilled in the art that the use of steam reforming in combination with hydropyrolysis and hydroconversion steps as set forth herein makes sense where the objective is to provide a self-sustaining process in which the ratio of $O_2$ in $H_2O$ to $O_2$ in CO and $CO_2$ produced by the process is about 1.0. In the absence of such an objective, steam reforming is not necessary because $H_2$ required for the hydropyrolysis step could still be provided by external sources. If one were to employ steam reforming in the absence of the objectives stated herein, one would not end up with the self-sustaining process of this invention in which the process output consists essentially of liquid hydrocarbon products and $CO_2$.

In accordance with one embodiment of this invention, the heat generated in the second reaction stage may be used to supply all or part of the heat needed to drive the hydropyrolysis step in the first reaction stage. In accordance with one embodiment of this invention, the process also employs recirculation of the heavy finished products as a wash liquid in the second step as stated herein above to capture process fines exiting the first stage pyrolysis reactor and control the heat of reaction. In accordance with one embodiment of this invention, this liquid is also recirculated to the hydroconversion and possibly to the first stage hydropyrolysis step to regulate the generation of heat in each step. The rate of recirculation is preferably in the range of about 3-5 times the biomass feed rate. This is necessary because hydrodeoxygenation is a strongly exothermic reaction.

In accordance with one embodiment of this invention, the biomass feed is any high lipid-containing aquatic biomass such as algae or an aquatic plant such as lemna. In a form where lipids have not been extracted, gasoline and diesel may be made directly from the aquatic biomass feed. This is particularly attractive because lipid extraction is expensive. Otherwise, with the process of this invention, gasoline and diesel boiling-point materials may be made from a delipidated aquatic biomass such as algae or an aquatic plant such as lemna. By contrast, conventional fast pyrolysis of algae and other aquatic biomass would be very unattractive because the uncontrolled thermal reactions characteristic of fast pyrolysis would degrade these lipids. Thus, the integrated process of this invention is ideal for aquatic biomass conversion because it may be carried out on aquatic biomass which is usually only partially dewatered and still produce high quality diesel and gasoline product.

The process of this invention provides several distinct advantages over conventional fast pyrolysis-based processes in that it produces a negligible to low-char, partially deoxygenated, stabilized product from which residual char and particles can be easily separated by hot gas filtration or contacting with a recirculated liquid; clean, hot hydropyrolysis oil vapors can be directly upgraded to a final product in a close-coupled second catalytically-enhanced process unit operated at almost the same pressure as was employed upstream; and upgrading is carried out quickly before degradation can occur in the vapor produced from the hydropyrolysis step.

The liquid hydrocarbon products produced by this process should contain less than 5% oxygen and preferably less than 2% oxygen with a low total acid number (TAN) and should exhibit good chemical stability to polymerization or a reduced tendency to display chemical reactivity. In a preferred embodiment of this invention wherein the total oxygen content of the product is reduced below 2%, the water and hydrocarbon phases will easily separate out in any normal separation vessel because the hydrocarbon phase has become hydrophobic. This is a significant advantage when compared to conventional pyrolysis in which the water is miscible with and mixed in with the highly oxygenated pyrolysis oil.

Because the fungible fuels produced in the disclosed process have low oxygen content, any excess water produced from this process is relatively free of dissolved hydrocarbons and will likely contain less than 2000 ppmv dissolved total organic carbon (TOC), rendering it suitable, for example, for use in irrigation in arid areas. Additionally, the finished hydrocarbon product now may be easily transportable, has a low total acid number (TAN), and excellent chemical stability. In conventional fast pyrolysis, the pyrolysis oils typically contain 50-60% oxygen in the form of oxygenated hydrocarbons and 25% dissolved water and must be chemically stabilized prior to transportation. Therefore, final products transportation costs alone for the integrated hydropyrolysis and hydroconversion process of this invention can be less than half of the costs for conventional fast pyrolysis. Furthermore, water produced in the proposed process becomes a valuable byproduct especially for arid regions.

If desired and as shown in FIG. 1, the process may desirably provide for ammonium sulfate recovery. In this regard, the gaseous fraction 166 is therefore directed to the $H_2S$ scrubber 168 and $H_2S$ stripper 172 which act in concert to deliver a gas stream 174 free of $H_2S$ and $NH_3$ to the packaged steam reformer-PSA/MSS unit 170 the purpose of which is to provide a pure hydrogen stream 176 to the hydropyrolysis reactor 116 and reject waste $CO_2$ (via a stream 178) from which further heat may be recovered to provide another source of process heat for drying biomass or for other purposes. Because this $CO_2$ is derived entirely from biomass it does not contribute to the Greenhouse Gas (GHG) burden of the process.

As shown in FIG. 1, the high pressure separator 142 delivers an aqueous stream 148 that contains ammonia and hydrogen sulfide in solution to a sour water stripper 180. The sour water stripper 180, separates the aqueous stream 148 received from the high pressure separator 142 into a water stream 182 rich in ammonia and $H_2S$ as well as a relatively pure water stream 184 that with further purification via a suitable water purifier 186 to remove all sulfur compounds provides a source of high-purity water 188 for the packaged steam reformer-PSA/MSS unit 170. Water rejected from the water purifier 186, shown as a stream 190, can be disposed of or recycled to the sour water stripper 180. The aqueous stream 182 from the sour water stripper 180 and the $H_2S$ stripper 172 are combined and directed to an oxidation reactor 192 where the combined streams can be reacted with oxygen in a thermal, non-catalytic conversion zone to substantially convert the dissolved ammonium sulfide $(NH_4)_2S$ to ammonium sulfate $(NH_4)_2SO_4$ and thiosulfate. The stream can be further contacted with oxygen and an oxidizing catalyst in accordance with the method disclosed in Gillespie, U.S. Pat. No. 5,470,486 or, alternatively, the incoming aqueous stream can be reacted with oxygen, in the presence of an appropriate catalyst, in accordance with the method disclosed in the U.S. Pat. No. 5,207,927 (Marinangeli, et al.). By employing either technology, within the ranges of pH, oxygen to sulfur mole ratio, pressure, temperature, and liquid hourly space velocities taught in these patents, an aqueous stream 194 containing ammonia $NH_3$ and $(NH_4)_2SO_4$ is thereby obtained, and these compounds can then be recovered and sold as fertilizer. A variety of methods for obtaining ammonium sulfate from an aqueous stream containing ammonium sulfite and dissolved ammonia are currently in use and the examples cited above serve to illustrate that established technologies exist for effecting this conversion. Excess $O_2$ and unreacted $N_2$ are rejected from the oxidation reactor as a stream 196.

Finally, the pure $H_2$ produced by the packaged steam reformer-PSA/MSS unit 170 is directed to a steam-driven compressor 198 where it is compressed and then passed to the hydropyrolysis reactor 116. Note that the steam used to drive the compressor 198 is provided from heat exchanger 130 and heat exchanger 140 (which, depending on process requirements, may be optional). Waste heat from the steam that drives the hydrogen compressor 198 is available to provide lower levels of process heat. Also note that the hydrogen delivered to the hydropyrolysis reactor 116 will have been cooled somewhat, which represents no challenge to the process as the exothermic nature of the hydropyrolysis reaction is sufficient to provide all of the heat required by the hydropyrolysis reactor 116.

Figure 2:
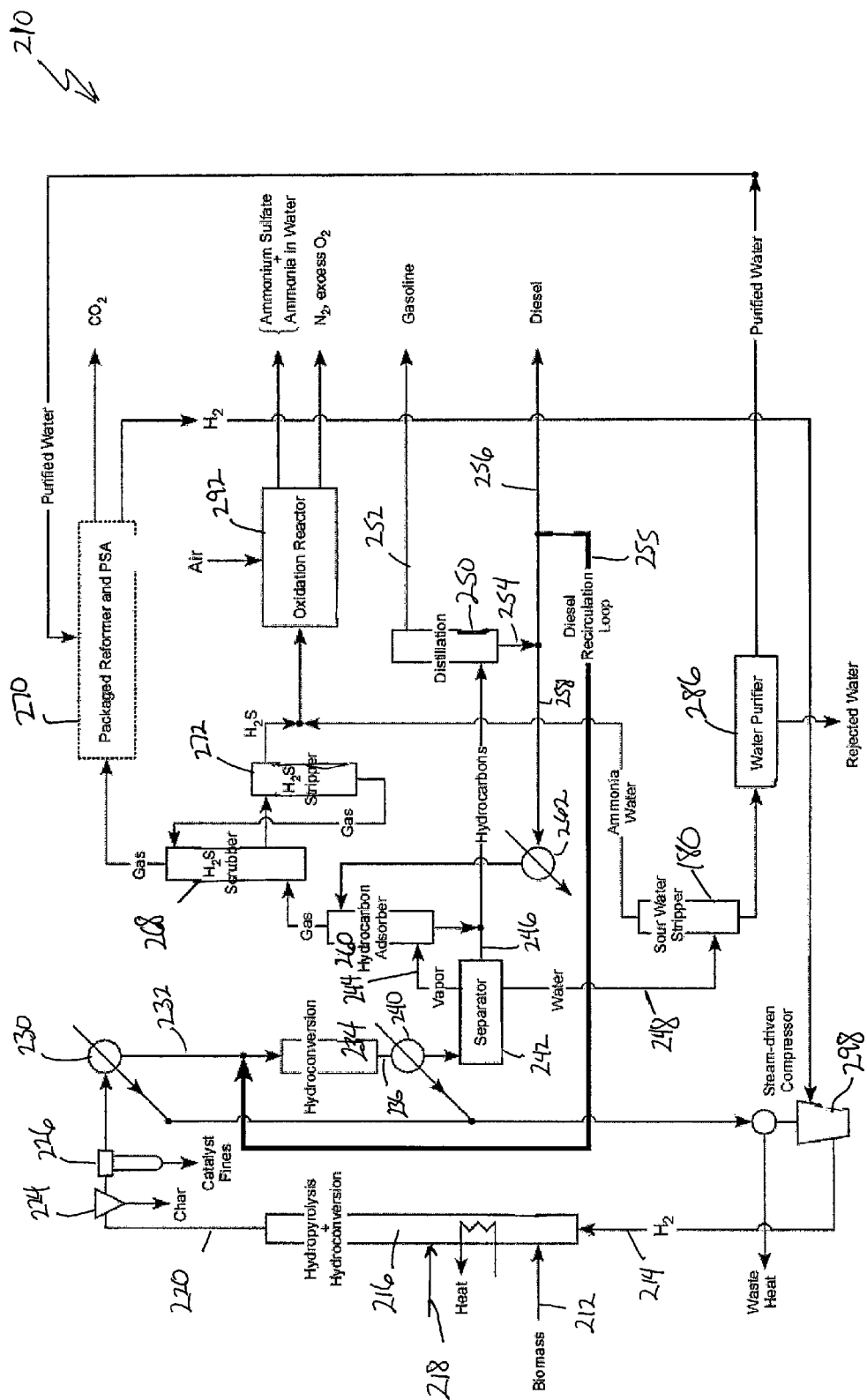
FIG. 2 is a schematic flow diagram of a process for producing hydrocarbon fuels from biomass in accordance with another embodiment of the invention, in which diesel boiling-point range materials are added to a substantially char and particle-free hydropyrolysis product feed to the hydroconversion reactor.

FIG. 2 is a schematic flow diagram of a process for producing hydrocarbon fuels from biomass in accordance with another embodiment of the invention, such process generally designated by the reference numeral 210.

The process 210 is generally similar to the process 110, described above. In particular, in the process 210, biomass (such as via a stream 212) and molecular hydrogen (such as via a stream 214) are introduced into a hydropyrolysis and hydroconversion reactor vessel 216, such as having a catalyst make-up port 218, to produce an output stream 220 comprising an at least partially deoxygenated, hydropyrolysis liquid product, pyrolysis vapors ($C_1$-$C_3$ gases), $H_2O$, $CO$, $CO_2$, $H_2$, and char. The output process stream 220 is passed to and through an optional char separator 224, a barrier filter 226 (such as to remove catalyst fines) and a process heat exchanger 230 which may be employed to produce process steam. The char and particle-free product stream 232 passes from the heat exchanger 230 to a second reaction stage that employs a hydroconversion reactor vessel 234 in which a hydroconversion step is carried out to complete deoxygenation and hydrogenation of the hydrocarbon product received from the hydropyrolysis reactor 216. The completely deoxygenated product passes, as a stream 236, from the second reaction stage 234 through a second process heat exchanger 240 (which can also be used to produce process steam and which, depending on process requirements may be optional) and to a high-pressure separator 242 to form, produce or separate into a gas (designated as vapors) fraction 244, hydrocarbon fraction 246 and a water fraction 248.

In the process 210, the gas/vapor fraction 244 and water fraction 248 are processed in a manner similar to that as in process 110 and will not be described in greater detail here.

Also similarly, the hydrocarbons exiting the high-pressure separator 242 are directed to a distillation column 250 which separates the hydrocarbons into a gasoline fraction 252 and a diesel fraction 254. The nominal diesel product stream 254 exiting the distillation column 250 is split, with a portion forming a diesel output stream 256 and another portion 258 being passed back to the top of a hydrocarbon adsorber 260 after having been passed through heat exchanger 262 (which, depending on process requirements may be optional).

The process 210 primarily differs from the process 110 in that the nominal diesel product stream 254 is further split such that a portion of the diesel product stream is diverted via a diesel recirculation loop 255 back to the entrance of the hydroconversion reactor 234 to retrace its path through the high pressure separator 242 and the distillation column 250 and thereby improve diesel quality. That is, a portion of the diesel boiling-point range materials are added to the char and particle-free hydropyrolysis product feed to the hydroconversion reactor 234, for example.

As shown, the process 210 may, if desired, include one or more features such as an $H_2S$ scrubber 268, a steam reformer-PSA/MSS unit 270, an $H_2S$ stripper 272, a sour water stripper 280, a suitable water purifier 286, an oxidation reactor 292 and a compressor 298, similar to those shown in FIG. 1.

Figure 3:
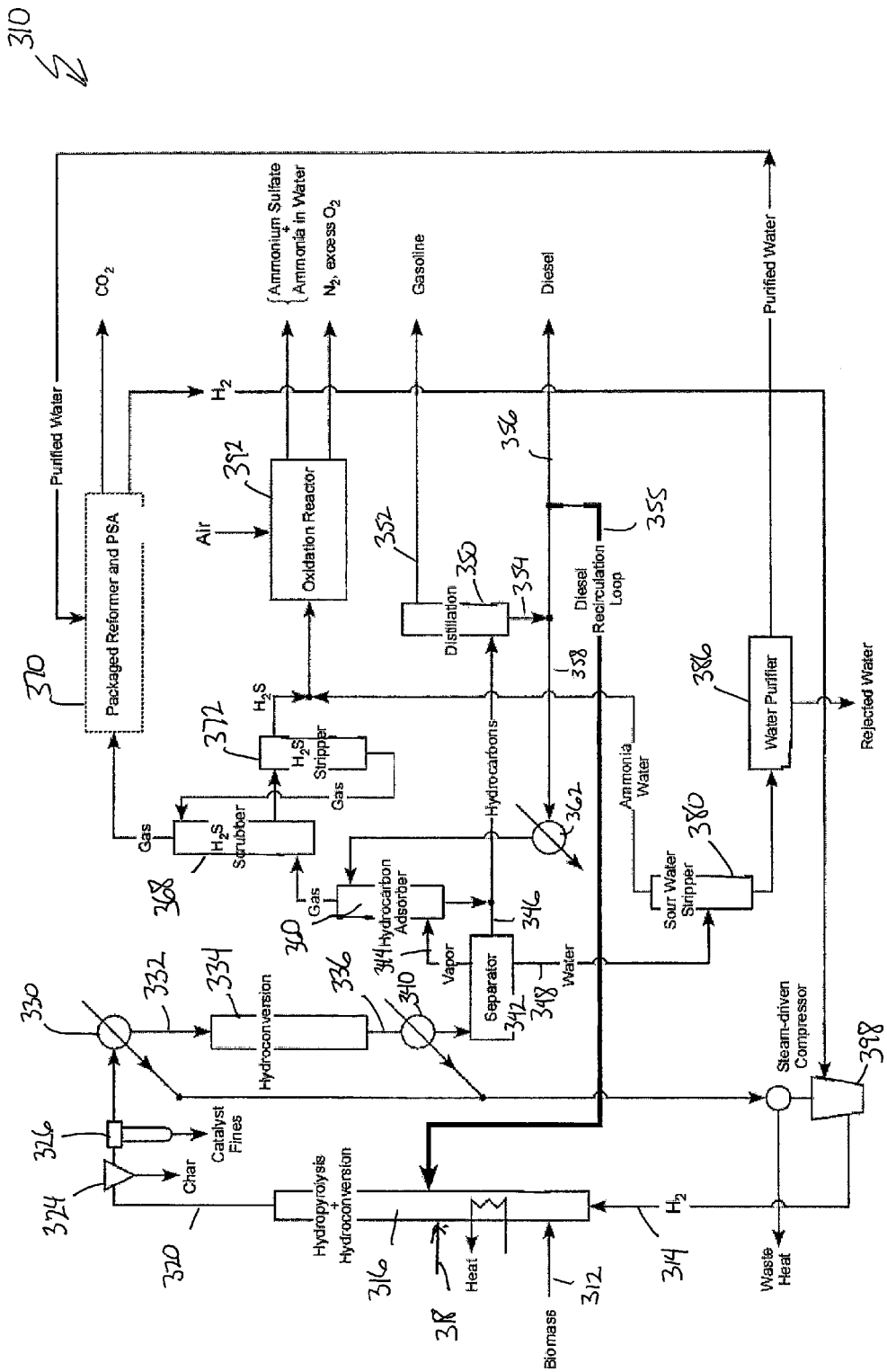
FIG. 3 is a schematic flow diagram of a process for producing hydrocarbon fuels from biomass in accordance with another embodiment of the invention, in which diesel boiling-point range materials are recirculated to the hydropyrolysis reactor.

FIG. 3 is a schematic flow diagram of a process for producing hydrocarbon fuels from biomass in accordance with another embodiment of the invention, such process generally designated by the reference numeral 310.

The process 310 is generally similar to the process 110, described above. In particular, in the process 310, biomass (such as via a stream 312) and molecular hydrogen (such as via a stream 314) are introduced into a hydropyrolysis and hydroconversion reactor vessel 316, such as having a catalyst make-up port 318, to produce an output stream 320 comprising an at least partially deoxygenated, hydropyrolysis liquid product, pyrolysis vapors ($C_1$-$C_3$ gases), $H_2O$, $CO$, $CO_2$, $H_2$, and char. The output process stream 320 is passed to and through an optional char separator 324, a barrier filter 326 (such as to remove catalyst fines) and a process heat exchanger 330 which may be employed to produce process steam. The char and particle-free product stream 332 passes from the heat exchanger 330 to a second reaction stage that employs a hydroconversion reactor vessel 334 in which a hydroconversion step is carried out to complete deoxygenation of the hydrocarbon product received from the hydropyrolysis reactor 316. The completely deoxygenated product passes, as a stream 336, from the second reaction stage 334 through a second process heat exchanger 340 (which can also be used to produce process steam and which, depending on process requirements may be optional) and to a high-pressure separator 342 to form, produce or separate into a gas (designated as vapors) fraction 244, hydrocarbon fraction 346 and a water fraction 348.

Also similarly, the hydrocarbons exiting the high-pressure separator 342 are directed to a distillation column 350 which separates the hydrocarbons into a gasoline fraction 352 and a diesel fraction 354. The nominal diesel product stream 354 exiting the distillation column 350 is split, with a portion forming a diesel output stream 356 and another portion 358 being passed back to the top of a hydrocarbon adsorber 360 after having been passed through heat exchanger 362 (which, depending on process requirements may be optional).

The process 310 primarily differs from the process 210 in that it illustrates another option for diesel product recirculation that permits a portion of the diesel fraction exiting the distillation column 350 to be recirculated back to the first fluidized bed hydropyrolysis and hydroconversion reactor 316 through the diesel recirculation loop 355 and thence retrace its steps to the hydroconversion reactor 334, the high pressure separator 342, and return to the distillation column 350.

As shown, the process 310 may, if desired, include one or more features such as an $H_2S$ scrubber 368, a steam reformer-PSA/MSS unit 370, an $H_2S$ stripper 372, a sour water stripper 380, a suitable water purifier 386, an oxidation reactor 392 and a compressor 398, similar to those shown in FIG. 1.

Figure 4:
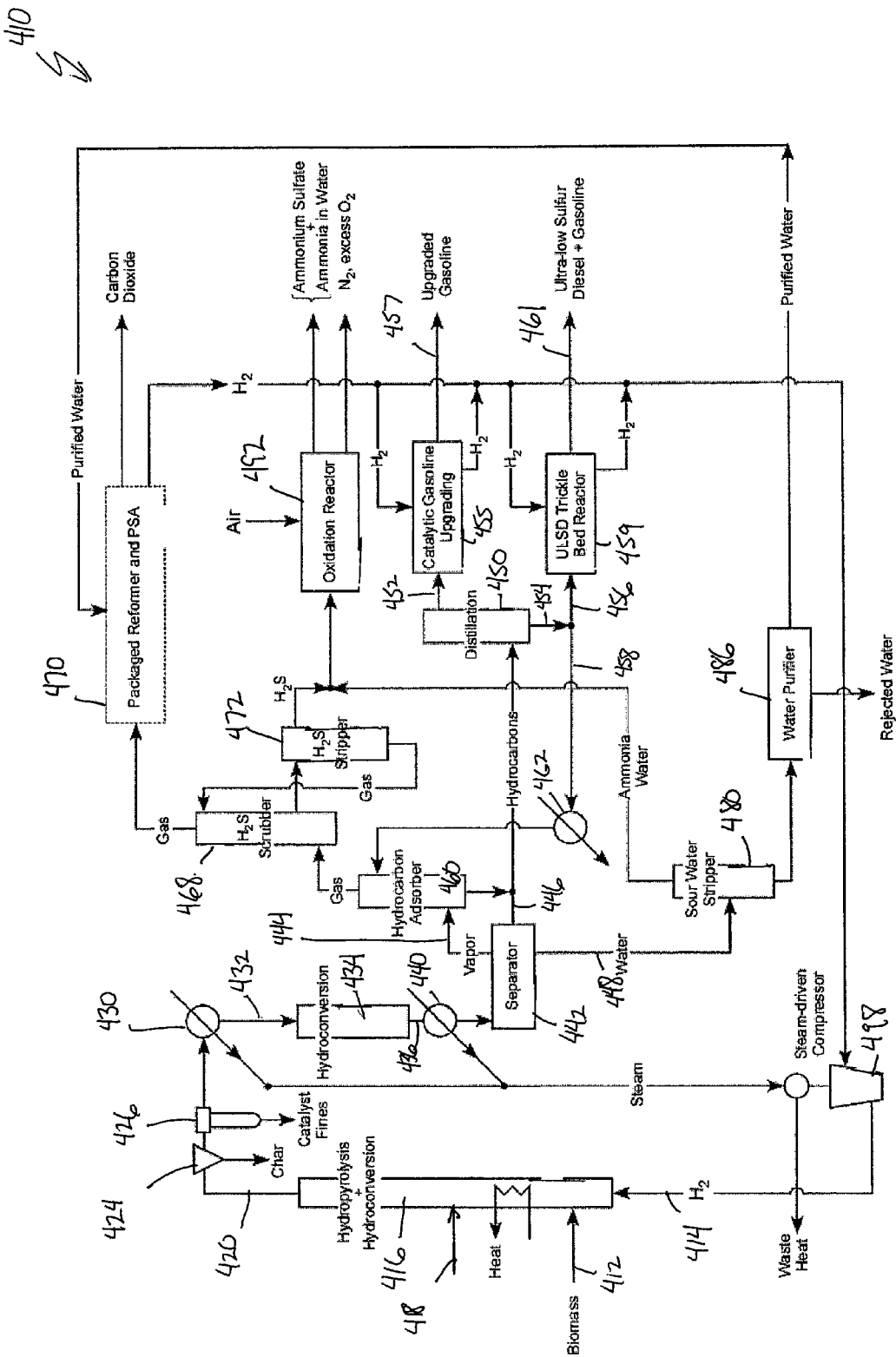
FIG. 4 is a schematic flow diagram of a process for producing hydrocarbon fuels from biomass in accordance with another embodiment of the invention, in which gasoline and diesel boiling-point range materials are further chemically and/or catalytically upgraded.

FIG. 4 is a schematic flow diagram of a process for producing hydrocarbon fuels from biomass in accordance with another embodiment of the invention, such process generally designated by the reference numeral 410.

The process 410 is generally similar to the process 110 described above. In particular, in the process 410, biomass (such as via a stream 412) and molecular hydrogen (such as via a stream 414) are introduced into a hydropyrolysis and hydroconversion reactor vessel 416, such as having a catalyst make-up port 418, to produce an output stream 420 comprising an at least partially deoxygenated, hydropyrolysis liquid product, pyrolysis vapors ($C_1$-$C_3$ gases), $H_2O$, CO, $CO_2$, $H_2$ and char. The output process stream 420 is passed to and through an optional char separator 424, a barrier filter 426 (such as to remove catalyst fines) and a process heat exchanger 430 which may be employed to produce process steam. The char and particle-free product stream 432 passes from the heat exchanger 430 to a second reaction stage that employs a hydroconversion reactor vessel 434 in which a hydroconversion step is carried out to complete deoxygenation of the hydrocarbon product received from the hydropyrolysis reactor 416. The completely deoxygenated product passes, as a stream 436, from the second reaction stage 434 through a second process heat exchanger 440 (which can also be used to produce process steam and which, depending on process requirements may be optional) and to a high-pressure separator 442 to form, produce or separate into a gas (designated as vapors) fraction 444, hydrocarbon fraction 446 and a water fraction 448. The hydrocarbons exiting the high-pressure separator 442 are directed to a distillation column 450 which separates the hydrocarbons into a gasoline fraction 452 and a diesel fraction 454. The nominal diesel product stream 454 exiting the distillation column 450 is split, with a portion forming a diesel output stream 456 and another portion 458 being passed back to the top of the hydrocarbon adsorber 460 after having been passed through heat exchanger 462 (which, depending on process requirements may be optional).

The process 410 primarily differs from the process 110 in that the process 410 now provides for the further chemical upgrade of the gasoline and diesel boiling materials, 452 and 456, respectively. More specifically, the process 410 includes: 1) a catalytic gasoline upgrading step 455 which receives the gasoline fraction 452 from the fractional distillation step 450 and therefore permits the production of an upgraded gasoline fraction 457, and 2) a catalytic trickle-bed reactor 459 that produces an ultra-low sulfur Diesel (ULSD) product 461 which, depending on the performance of the fractional distillation apparatus 450, could contain a small portion of gasoline that was directed to the catalytic trickle-bed reactor 459.

As shown, the process 410 may, if desired, include one or more features such as an $H_2S$ scrubber 468, a steam reformer-PSA/MSS unit 470, an $H_2S$ stripper 472, a sour water stripper 480, a suitable water purifier 486, an oxidation reactor 492 and a compressor 498, similar to those shown in FIG. 1.

Figure 5:
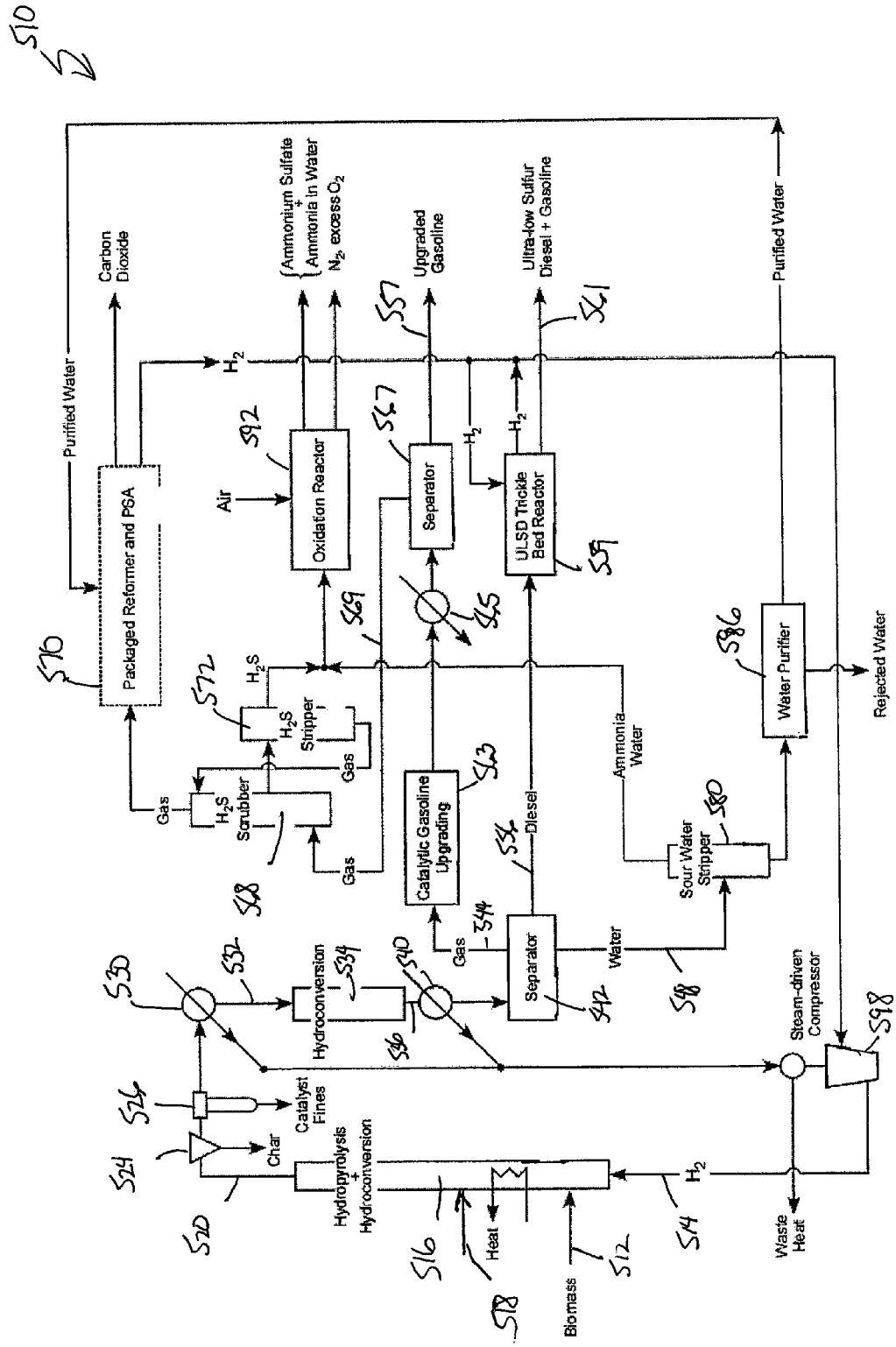
FIG. 5 is a schematic flow diagram of a process for producing hydrocarbon fuels from biomass in accordance with another embodiment of the invention, in which gasoline and diesel boiling-point range materials are further chemically and/or catalytically upgraded by another process.

FIG. 5 illustrates a process for producing hydrocarbon fuels from biomass in accordance with another embodiment of the invention, such process generally designated by the reference numeral 510.

The process shown 510 is generally similar to the process 410 described above in that the gasoline and diesel boiling materials are further chemically upgraded by further processing. To that end, more particularly, in the process 510, biomass (such as via a stream 512) and molecular hydrogen (such as via a stream 514) are introduced into a hydropyrolysis and hydroconversion reactor vessel 516, such as having a catalyst make-up port 518, to produce an output stream 520 comprising an at least partially deoxygenated, hydropyrolysis liquid product, pyrolysis vapors ($C_1$-$C_3$ gases), $H_2O$, CO, $CO_2$, $H_2$, and char. The output process stream 520 is passed to and through an optional char separator 524, a barrier filter 526 (such as to remove catalyst fines) and a process heat exchanger 530 which may be employed to produce process steam. The char and particle-free product stream 532 passes from the heat exchanger 530 to a second reaction stage that employs a hydroconversion reactor vessel 534 in which a hydroconversion step is carried out to complete deoxygenation of the hydrocarbon product received from the hydropyrolysis reactor 516. The completely deoxygenated product passes, as a stream 536, from the second reaction stage 534 through a second process heat exchanger 540 (which can also be used to produce process steam and which, depending on process requirements may be optional) and to a high-pressure separator 542

In the process 510, however, the high-pressure separator 542 is operated at a higher temperature such as to produce a gaseous hydrocarbon stream 544, a diesel product stream 556 and a water stream 548, as opposed to the process shown in FIG. 4 wherein the separator 442 produces a hydrocarbon vapor stream that is then passed to a hydrocarbon adsorber 460. In the process embodiment shown in FIG. 5, the hydrocarbon gas stream 544 discharged by the separator 542 is passed directly to a catalytic gasoline upgrading step 563 whose product is cooled in a heat exchanger 565 (which, depending on process requirements may be optional) before it is passed to a separator 567 which diverts a gas fraction 569 (gaseous $C_1$ through $C_4$ hydrocarbons with other process gases) to an $H_2S$ scrubber 568 and an $H_2S$ stripper 572 similar to the processes shown in FIGS. 1-4, while an upgraded liquid gasoline fraction 557 is produced as a process product.

Similar to the process 410, the process 510 includes a catalytic trickle-bed reactor 559 that processes the diesel product 556 to produce an ultra-low sulfur Diesel (ULSD) product 561 which could contain a small portion of gasoline.

Note in this embodiment that the gas exhaust from the separator 542 contains no vapors but only gases. As opposed to the process embodiments shown in FIGS. 1-4, where the separator exhaust was maintained at a lower temperature so that vapors were exhausted to a hydrocarbon adsorber, in this and following process embodiments, gases exiting the separator will have a higher temperature suitable for introduction to a catalytic gasoline upgrading step. Otherwise, the balance of this embodiment of the process remains similar to that depicted in FIG. 4.

As shown, the process 510 may, if desired, include one or more features such as a steam reformer-PSA/MSS unit 570, a sour water stripper 580, a suitable water purifier 586, an oxidation reactor 592 and a compressor 598, similar to those shown in FIG. 1.

While the processes of the invention have been shown in the above-described figures with the inclusion of a second hydrotreatment reactor, those skilled in the art and guided by the teachings herein provide will appreciate that the broader practice of the invention is not necessarily so limited. For example, in a case where sufficiently active catalysts are available that can produce a completely deoxygenated hydrocarbon product in the fluid bed reactor 116, 216, 316, 416 and 516, for example, a separate second hydroconversion reactor can become unnecessary. Thus, it is to be understood that the processes shown in FIGS. 1-5 can in such instances be appropriately accordingly modified. That is, if desired the processes of the invention can be carried out with or without a second hydrotreating reactor and that the presence or absence of such second hydrotreating reactor does not necessarily create a fundamentally different process.

Figure 6:
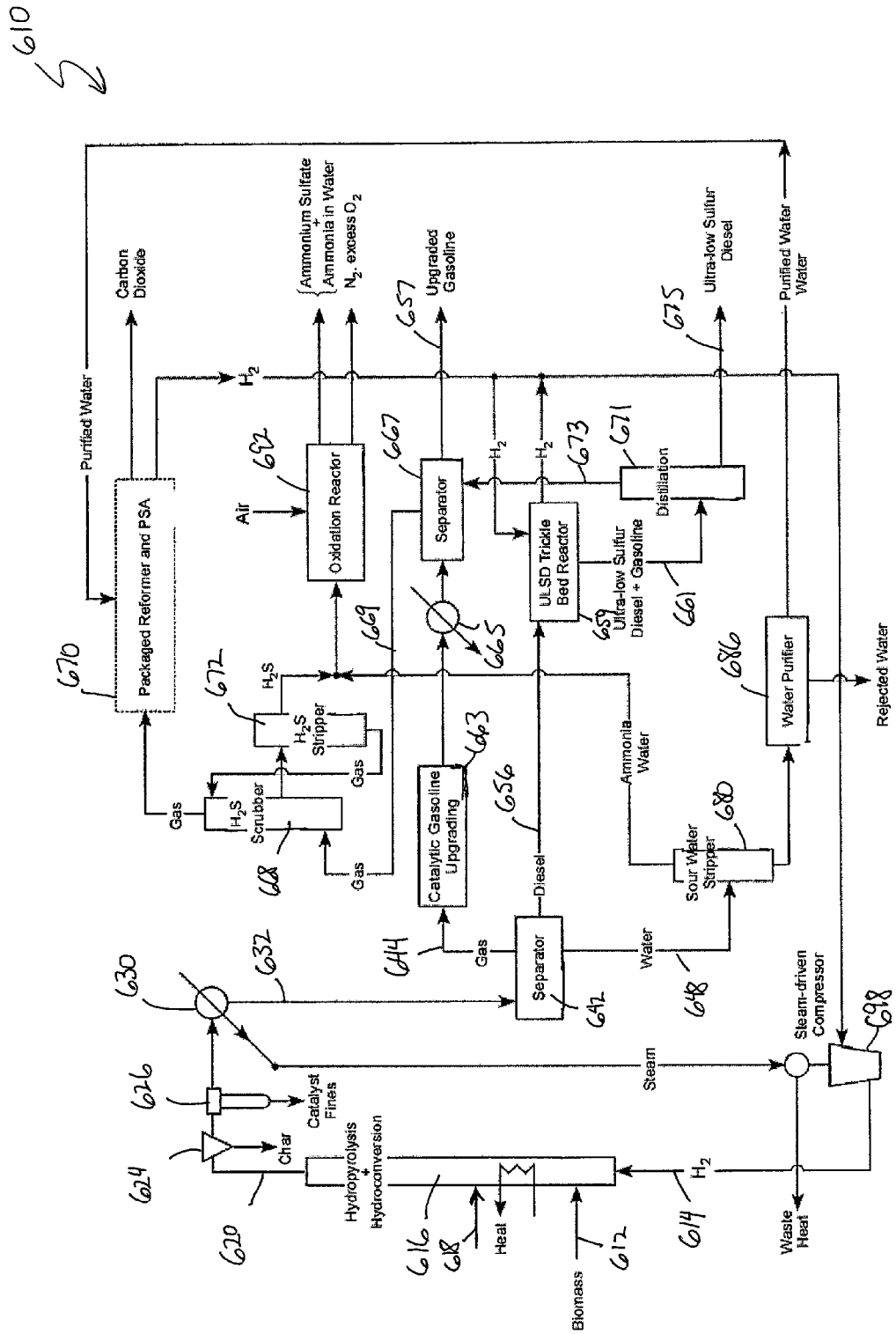
FIG. 6 is a schematic flow diagram of a process for producing hydrocarbon fuels from biomass in accordance with another embodiment of the invention, in which effective hydropyrolysis and hydroconversion are carried out in a single reactor so that a separate hydroconversion reactor is not required and a true ultra-low sulfur diesel (ULSD) product is produced.

FIG. 6 illustrates a process for producing hydrocarbon fuels from biomass in accordance with another embodiment of the invention, such process generally designated by the reference numeral 610.

The process 610 is similar to the process 510 in that in the process 610, biomass (such as via a stream 612) and molecular hydrogen (such as via a stream 614) are introduced into a hydropyrolysis and hydroconversion reactor vessel 616, such as having a catalyst make-up port 618, to produce an output stream 620 comprising an at least partially deoxygenated, hydropyrolysis liquid product, pyrolysis vapors ($C_1$-$C_3$ gases), $H_2O$, CO, $CO_2$, $H_2$, and char. The output process stream 620 is passed to and through an optional char separator 624, a barrier filter 626 (such as to remove catalyst fines) and a process heat exchanger 630 which may be employed to produce process steam.

The process 610 differs from the process 510 in that a second hydroconversion reactor, such as 534, has been deleted such that the char and particle-free product stream 632 passes from the heat exchanger 630 to a high-pressure separator 642. Similar to the process 510 described above, the high-pressure separator 642 is operated at a sufficiently high temperature such as to produce a gaseous hydrocarbon stream 644, a diesel product stream 656 and a water stream 648.

The hydrocarbon gas stream 644 is passed directly to a catalytic gasoline upgrading step 663 whose product is cooled in a heat exchanger 665 (which, depending on process requirements may be optional) before it is passed to a separator 667 which diverts a gas fraction 669 (gaseous $C_1$ through $C_4$ hydrocarbons with other process gases) to an $H_2S$ scrubber 668 and $H_2S$ stripper 672 similar to the processes shown in FIGS. 1-4, while an upgraded liquid gasoline fraction 657 is produced as a process product.

Also similar to the process 510, the process 610 includes a catalytic trickle-bed reactor 659 that processes the diesel product 656. The process 610 differs from the process 510 in that the process 610 includes a fractional distillation unit 671 that receives a ULSD product stream 661 from the trickle-bed reactor 659 that could contain some small gasoline fraction. The fractional distillation unit 671 separates remaining gasoline material in the ULSD product stream 661 and passes it, such as via a stream 673, to the separator 667 where it is mixed with an already upgraded gasoline product from the catalytic gasoline upgrading unit 663 so as to form the product stream 657. The fractional distillation unit 671 then can discharge a true ULSD product stream 675 (i.e., a product stream that is substantially free of a gasoline fraction).

As shown, the process 610 may, if desired, include one or more features such as a steam reformer-PSA/MSS unit 670, a sour water stripper 680, a suitable water purifier 686, an oxidation reactor 692 and a compressor 698, similar to those shown in FIG. 1.

As will be further understood, a hydroconversion reactor can be added, such as following the heat exchanger 630, if desired or required, such as to appropriately maintain product quality.

Figure 7:
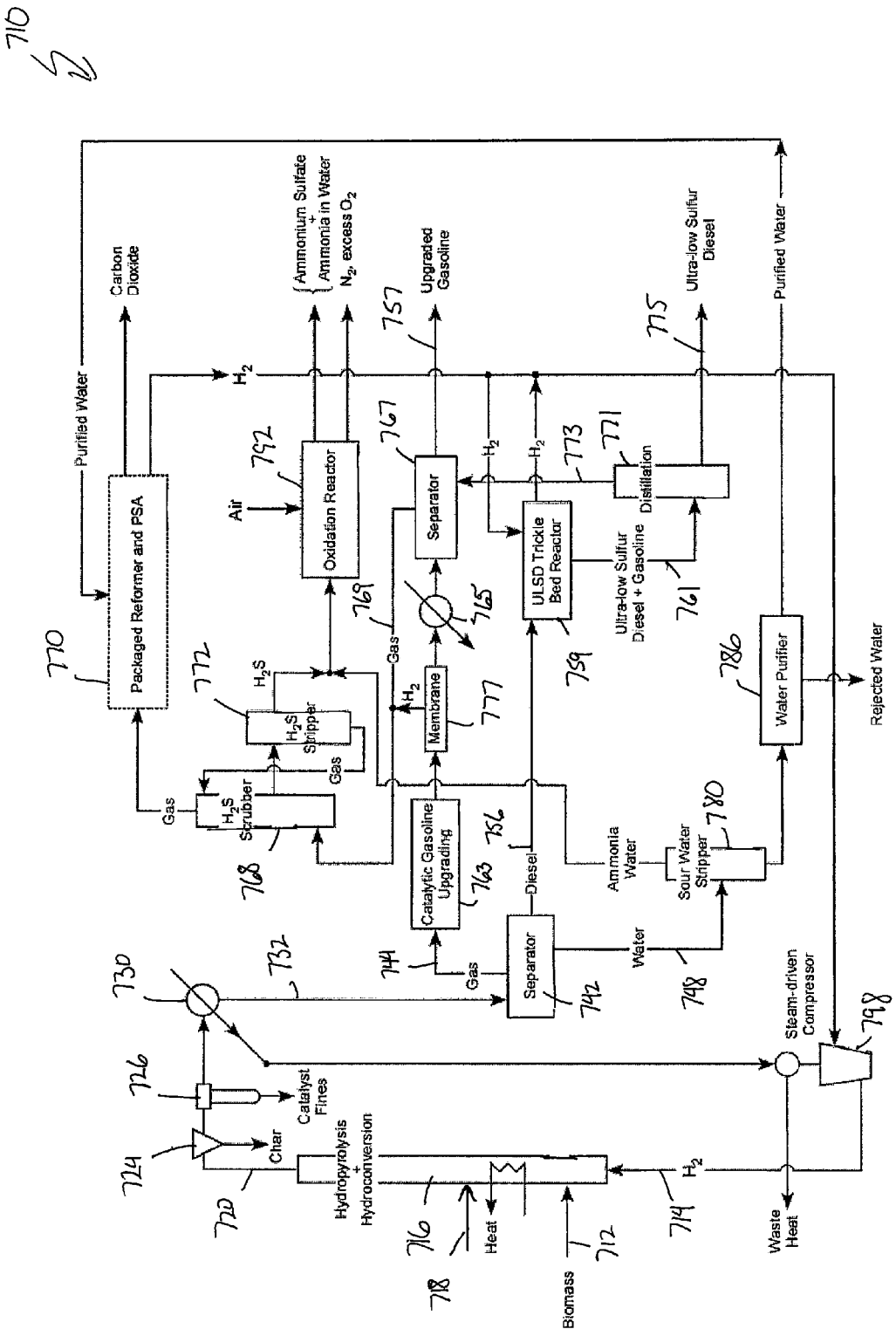
FIG. 7 is a schematic flow diagram of a process for producing hydrocarbon fuels from biomass in accordance with another embodiment of the invention, in which effective hydropyrolysis and hydroconversion are carried out in a single reactor so that a separate hydroconversion reactor is not required and enhanced $H_2$ extraction is employed.

FIG. 7 illustrates a process embodiment for producing hydrocarbon fuels from biomass in accordance with another embodiment of the invention, such process generally designated by the reference numeral 710.

As described in greater detail below, the process 710 is generally similar to the process 610 described above with the process 710, however, employing enhanced $H_2$ extraction.

In particular, in the process 710, biomass (such as via a stream 712) and molecular hydrogen (such as via a stream 714) are introduced into a hydropyrolysis and hydroconversion reactor vessel 716, such as having a catalyst make-up port 718, to produce an output stream 720 comprising an at least partially deoxygenated, hydropyrolysis liquid product, pyrolysis vapors ($C_1$-$C_3$ gases), $H_2O$, CO, $CO_2$, $H_2$ and char. The output process stream 720 is passed to and through an optional char separator 724, a barrier filter 726 (such as to remove catalyst fines) and a process heat exchanger 730 which may be employed to produce process steam. The char and particle-free product stream 732 passes from the heat exchanger 730 to a high-pressure separator 742. The high-pressure separator 742 is desirably operated at a sufficiently high temperature such as to produce a gaseous hydrocarbon stream 744, a diesel product stream 756 and a water stream 748.

The hydrocarbon gas stream 744 is passed directly to a catalytic gasoline upgrading step 763. Process efficiency for the process 710 is improved over the embodiment shown in FIG. 6, however, through the introduction of a membrane separator 777 after the catalytic gasoline upgrading step 763. The membrane separator 777 desirably serves to separate hydrogen from the product stream of the catalytic gasoline upgrading step 763 and directs such hydrogen to the process gases that enter an $H_2S$ scrubber 768 and an $H_2S$ stripper 772 similar to the processes shown in FIGS. 1-4. As a result, the amount of gas that passes through heat exchanger 765 and gas/liquid separator 767 can be significantly reduced as compared to the same point in the process 610.

Similar to the same point in the process 610 described above, the product, now from the membrane separator 777 is cooled in a heat exchanger 765 (which, depending on process requirements may be optional) before it is passed to a separator 767 which diverts a gas fraction 769 (gaseous $C_1$ through $C_3$ hydrocarbons with other process gases) to an $H_2S$ scrubber 768 and an $H_2S$ stripper 772, while an upgraded liquid gasoline fraction 757 is produced as a process product.

Similar to the above-described embodiment, the process 710 includes a catalytic trickle-bed reactor 759 that processes the diesel product 756. The process 710 includes a fractional distillation unit 771 that receives a ULSD product stream 761 from the trickle-bed reactor 759 that could contain some small gasoline fraction. The fractional distillation unit 771 separates remaining gasoline material in the ULSD product stream 761 and passes it, such as via a stream 773, to the separator 767 where it is mixed with an already processed upgraded gasoline product from the catalytic gasoline upgrading unit 763 and forms the product stream 757 and the gas fraction stream 769. The fractional distillation unit 771 then can discharge a true ULSD product stream 775 (i.e., a product stream that is substantially free of a gasoline fraction).

As shown, the process 710 may, if desired, include one or more features such as a steam reformer-PSA/MSS unit 770, a sour water stripper 780, a suitable water purifier 786, an oxidation reactor 792 and a compressor 798, similar to those shown in FIG. 1.

While in FIG. 7 the illustrated embodiment is again shown without the inclusion of a second hydroconversion reactor, such as shown in the embodiments depicted in FIGS. 1-5, a hydroconversion reactor can be added, such as following the heat exchanger 730, if desired or required, such as to appropriately maintain product quality.

Figure 8:
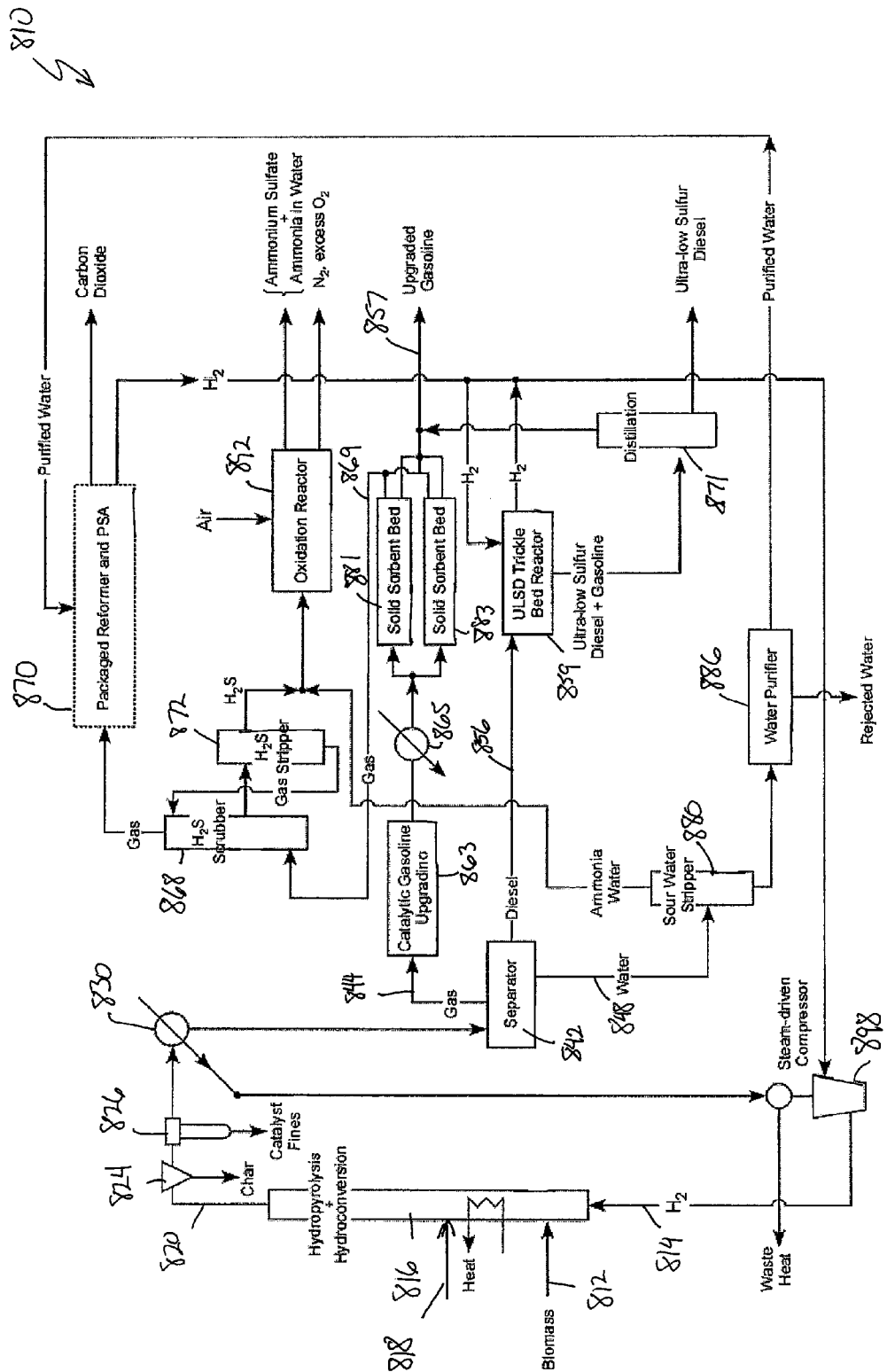
FIG. 8 is a schematic flow diagram of a process for producing hydrocarbon fuels from biomass in accordance with another embodiment of the invention, in which effective hydropyrolysis and hydroconversion are carried out in a single reactor so that a separate hydroconversion reactor is not required and solid sorbent beds are employed.

FIG. 8 is a schematic flow diagram of a process for producing hydrocarbon fuels from biomass in accordance with another embodiment of the invention, such process generally designated by the reference numeral 810.

The process 810 is generally similar to the process 610 described above except through the inclusion of solid sorbent beds to provide an upgraded gasoline product.

In the process 810, biomass (such as via a stream 812) and molecular hydrogen (such as via a stream 814) are introduced into a hydropyrolysis and hydroconversion reactor vessel 816, such as having a catalyst make-up port 818, to produce an output stream 820 comprising an at least partially deoxygenated, hydropyrolysis liquid product, pyrolysis vapors ($C_1$-$C_3$ gases), $H_2O$, CO, $CO_2$, $H_2$ and char. The output process stream 820 is passed to and through an optional char separator 824, a barrier filter 826 (such as to remove catalyst fines) and a process heat exchanger 830 which may be employed to produce process steam. The char and particle-free product stream 832 passes from the heat exchanger 830 to a high-pressure separator 842. The high-pressure separator 842 is desirably operated at a sufficiently high temperature such as to produce a gaseous hydrocarbon stream 844, a diesel product stream 856 and a water stream 848.

The hydrocarbon gas stream 844 is passed to a catalytic gasoline upgrading step 863 whose product is cooled in a heat exchanger 865 (which, depending on process requirements may be optional) before it is passed to a bank of solid sorbent beds 881 and 883. Note that heat exchanger 865 may be optional and is shown to highlight one possibly suitable method for maintaining the inlet temperature of gas entering a solid sorbent bed at a proper value.

The solid sorbent beds 881 and 883 are generally configured so that one bed receives gas from the heat exchanger 865 absorbing the upgraded gasoline product and exhausts gasses depleted of the upgraded gasoline product to the $H_2S$ scrubber 868 while the other solid sorbent bed has been taken off line while gasoline that has been adsorbed thereby is appropriately desorbed and directed to the upgraded gasoline product exhaust 857. At an appropriate time when the off-line solid sorbent bed has been depleted of adsorbed gasoline and the other solid sorbent bed has become fully loaded, processing through the solid sorbent beds is appropriately switched and the process continued such that one solid sorbent bed is in receiving communication of gases from which gasoline is adsorbed with gasoline-depleted gases 869 directed to the $H_2S$ scrubber 868 while the other solid sorbent bed exhausts desorbed upgraded gasoline to the product exhaust 857.

As shown, the process 810 may, if desired, include one or more features such as a catalytic trickle-bed reactor 859, a steam reformer-PSA/MSS unit 870, a fractional distillation unit 871, a sour water stripper 880, a suitable water purifier 886, an oxidation reactor 892 and a compressor 898, such as corresponding to those shown in the above described embodiments.

As with FIGS. 6 and 7, FIG. 8 shows a process embodiment in which the second hydroconversion reactor shown in the process embodiments depicted in FIGS. 1-5 has been deleted. As noted above, following the heat exchanger 830, a hydroconversion reactor could be added, if required, to maintain product quality.

Figure 9:
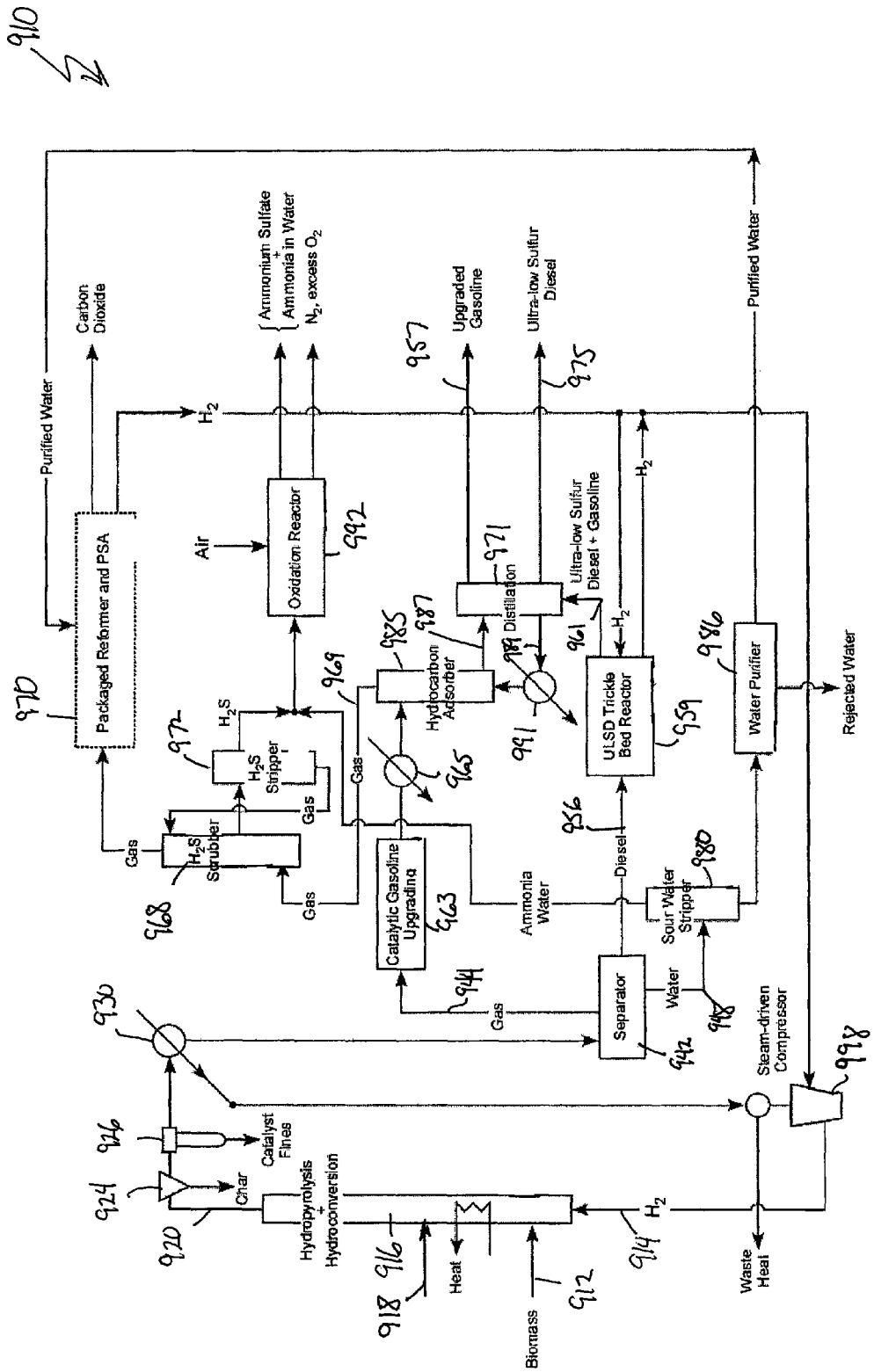
FIG. 9 is a schematic flow diagram of a process for producing hydrocarbon fuels from biomass in accordance with another embodiment of the invention, in which effective hydropyrolysis and hydroconversion are carried out in a single reactor so that a separate hydroconversion reactor is not required and gasoline adsorption is employed.

FIG. 9 is a schematic flow diagram of a process for producing hydrocarbon fuels from biomass in accordance with another embodiment of the invention, such process generally designated by the reference numeral 910.

The process 910 is somewhat similar to the process 810, described above, except that the process 910 employs gasoline adsorption. More particularly, FIG. 9 shows a process embodiment in which a hydrocarbon adsorber is added in place of the dual solid sorbent beds and together with the inclusion of other process modifications serve to provide an upgraded gasoline product.

In the process 910, biomass (such as via a stream 912) and molecular hydrogen (such as via a stream 914) are introduced into a hydropyrolysis and hydroconversion reactor vessel 916, such as having a catalyst make-up port 918, to produce an output stream 920 comprising an at least partially deoxygenated, hydropyrolysis liquid product, pyrolysis vapors ($C_1$-$C_3$ gases), $H_2O$, CO, $CO_2$, $H_2$, and char. The output process stream 920 is passed to and through an optional char separator 924, a barrier filter 926 (such as to remove catalyst fines) and a process heat exchanger 930 which may be employed to produce process steam. The char and particle-free product stream 932 passes from the heat exchanger 930 to a high-pressure separator 942. The high-pressure separator 942 is desirably operated at a sufficiently high temperature such as to produce a gaseous hydrocarbon stream 944, a diesel product stream 956 and a water stream 948.

The hydrocarbon gas stream 944 is passed to a catalytic gasoline upgrading step 963 whose product is cooled in a heat exchanger 965 (which, depending on process requirements may be optional) before it is passed to a hydrocarbon adsorber. As noted above, the heat exchanger 965 may be optional and it is included in the illustrated embodiment to show one method for maintaining the inlet temperature of gas entering a hydrocarbon adsorber at a proper value. As opposed to the dual solid sorbent beds shown in FIG. 8, in FIG. 9, the two solid sorbent beds are replaced by a single hydrocarbon adsorber 985. The hydrocarbon adsorber 985 desirably serves to continuously discharge a gasoline-free gas stream 969 to the $H_2S$ scrubber 968 while providing a separate gasoline-rich stream 987 to a fractional distillation unit 971. The distillation unit 971 also receives a stream 961 containing ULSD and gasoline from the trickle-bed reactor 959. The fractional distillation unit 971 serves to provide a stream 975 of true ULSD product, a stream 957 of upgraded gasoline, and a gasoline-containing stream 989 that is directed to a heat exchanger 991 before being directed to the hydrocarbon adsorber 985. The heat exchanger 991 may be optional and it is included in this embodiment to show one method for maintaining the inlet temperature of gas entering a hydrocarbon adsorber 985 at a proper value. Through this arrangement, the distillation unit 971 produces two product streams, an upgraded gasoline stream 957 and a true ULSD stream 975.

As shown, the process 910 may, if desired, include one or more additional features such as a steam reformer-PSA/MSS unit 970, an $H_2S$ stripper 972, a sour water stripper 980, a suitable water purifier 986, an oxidation reactor 992 and a compressor 998, such as corresponding to those shown in the above described embodiments.

As with FIGS. 6-8, FIG. 9 shows a process embodiment in which the second hydroconversion reactor shown in the process embodiments depicted in FIGS. 1-5 has been deleted. As noted above, following heat exchanger 930, a hydroconversion reactor could be added, if required, to maintain product quality.

In view of the above, it is to be appreciated that the present invention extends biomass processing, such as described in above-identified U.S. patent applications Ser. No. 12/419,535, filed 7 Apr. 2009; Ser. No. 12/685,352, filed 11 Jan. 2010; Ser. No. 13/089,010, filed 18 Apr. 2011; and Ser. No. 13/196,645, filed 2 Aug. 2011, to processing where fractionated upgraded gasoline and ultra-low sulfur diesel fuels can be process output streams. By employing fractional distillation and integrating other refinery-like processes, at least two separate fungible fuel streams can be produced, one dominated by gasoline boiling-point range liquids and the other by diesel boiling-point range liquids. Further, the inventors have developed a variety of process schemes up to and including multi-stage distillation units coupled to an array of reactors situated to accept these boiling-point ranges as well as perhaps a jet fuel range that can undergo catalytic upgrading to remove impurities and create JP-8 boiling-point range fuels. Clearly, these distillation ranges can be modified to optimize the hydrocarbons produced from a single fuel (e.g., wood produces high-grade gasoline but poorer quality diesel fuel, lemna produces superior diesel fuel but relatively mediocre gasoline, and blends of the two fuels may produce interesting ranges of hydrocarbon fuels that would benefit from carefully configured fractional distillation cuts coupled to downstream catalytic upgrading reactors). Thus, the approach herein described allows for the direct production of several fuels from a single biomass processing reactor, thereby improving process economics, increasing process versatility, and allowing for a self-contained process that can operate independently with no need for a refinery to produce a final finished gasoline or diesel fuel.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

The invention claimed is:

1. A process for producing hydrocarbon fuels from biomass, the process comprising:
   (a) hydrotreating biomass at hydrotreatment reaction conditions to produce a hydrotreatment product comprising a deoxygenated hydrocarbon product including gasoline and diesel boiling-point range materials, said hydrotreating comprising:
      hydropyrolyzing the biomass in a reactor containing molecular hydrogen and a deoxygenating and hydrogen addition catalyst at hydropyrolysis reaction conditions to produce a deoxygenated hydrocarbon hydropyrolysis product comprising char and vapors;
      separating substantially all of said char and particles from said deoxygenated hydrocarbon hydropyrolysis product to produce a substantially char and particle-free hydropyrolysis product;
   (b) separating each of said gasoline and diesel boiling-point range fractions from said hydrotreatment product and each other;
   (c) separating said gasoline boiling-point range materials from said diesel boiling-point range fractions;
   (d) upgrading said separated gasoline and diesel boiling-point range fractions.

2. The process of claim 1 wherein said separated gasoline boiling-point range fraction is catalytically upgraded at catalytic gasoline upgrade conditions to form an upgraded gasoline product.

3. The process of claim 1, wherein said separated diesel boiling-point range fraction is treated to produce an ultra-low sulfur diesel product.

4. The process of claim 3 wherein the treatment of the separated diesel boiling-point range fraction to produce an ultra-low sulfur diesel product comprises treating the separated diesel boiling-point range material in an ultra-low sulfur diesel trickle-bed reactor.

5. The process of claim 4 wherein an ultra-low sulfur diesel trickle-bed reactor produces a product stream comprising primarily ultra-low sulfur diesel and some residual gasoline, said process additionally comprising separating at least a portion of said residual gasoline from said ultra-low sulfur diesel.

6. The process of claim 4 wherein said separated gasoline boiling-point range fraction is catalytically upgraded at catalytic gasoline upgrading conditions to form an upgraded gasoline product.

7. The process of claim 1 wherein said hydrotreatment product additionally comprises gaseous and water fractions.

8. The process of claim 7 additionally comprising separating said gaseous and water fractions from said hydrotreatment product.

9. The process of claim 8 wherein:
   said gasoline boiling-point range fraction and said gaseous fraction are separated together from said hydrotreatment product and subjected to catalytic gasoline upgrading at catalytic gasoline upgrading conditions to form a catalytic gasoline upgrading product comprising catalytically upgraded gasoline and gaseous fraction and additionally comprising separating said gaseous product from said catalytically upgraded gasoline.

10. The process of claim 9 additionally comprising:
    separating hydrogen from said catalytic gasoline upgrading product prior to separation of other gaseous components therefrom.

11. The process of claim 9 wherein said separating said gaseous product from said catalytically upgraded gasoline comprises processing said catalytic gasoline upgrade product via a sorbent bed effective to absorb the catalytically upgraded gasoline.

12. The process of claim 9 wherein said separating said gaseous product from said catalytically upgraded gasoline comprises processing said catalytic gasoline upgrading product via a hydrocarbon adsorber to produce a gaseous effluent stream and a gasoline-rich stream.

13. The process of claim 1 wherein said hydrotreating further comprises:
    hydroconverting said substantially char and particle-free hydropyrolysis product in a separate hydroconversion reactor using a hydroconversion catalyst at hydroconversion reaction conditions to produce the deoxygenated hydrocarbon product including gasoline and diesel boiling-point range materials.

14. The process of claim 1 wherein at least a portion of said separated diesel boiling-point range fraction is added to the substantially char and particle-free hydropyrolysis product.

15. The process of claim 1 wherein at least a portion of said separated diesel boiling-point range fraction is recirculated to the reactor.

16. The process of claim 1 additionally comprising replacing catalyst in the reactor that has been attrited or decomposed through a make-up port disposed in the reactor.

17. The process of claim 1 wherein said reactor comprises a hydropyrolysis and hydroconversion reactor.

18. A process for producing hydrocarbon fuels from biomass, the process comprising:
   (a) hydropyrolyzing biomass in a hydropyrolysis reactor vessel containing molecular hydrogen and a deoxygenating and hydrogen addition catalyst, to produce a hydropyrolysis and hydroconversion product comprising a hydropyrolysis gas comprising $CO_2$, CO and $C_1$-$C_3$ gases, a partially deoxygenated hydropyrolysis liquid, water and char;
   (b) removing substantially all of said char and particles from at least said partially deoxygenated hydropyrolysis liquid to form a substantially char and particle-free partially deoxygenated hydropyrolysis liquid;
   (c) hydroconverting said substantially char and particle-free partially deoxygenated hydropyrolysis liquid in a separate hydroconversion reactor vessel using a hydroconversion catalyst in the presence of the hydropyrolysis gas to produce a deoxygenated hydrocarbon liquid including gasoline and diesel boiling fractions, a gaseous mixture comprising CO, $CO_2$, and light hydrocarbon gases ($C_1$-$C_3$) and water;

(d) steam reforming at least a portion of said gaseous mixture using water produced in at least one of said hydropyrolysis and hydroconversion steps to produce reformed molecular hydrogen;

(e) introducing at least a portion of said reformed molecular hydrogen into said hydropyrolysis reactor vessel;

(f) separating each of said gasoline and diesel boiling-point range materials from said deoxygenated hydrocarbon liquid and each other; and (g) upgrading said separated gasoline and diesel boiling-point range fractions.

19. The process of claim 18 wherein said separating each of said gasoline and diesel boiling-point range materials from said deoxygenated hydrocarbon liquid and each other comprises first separating said gasoline and diesel boiling-point range materials from said deoxygenated hydrocarbon liquid followed by separating said gasoline boiling-point range materials from said diesel boiling-point range materials.

20. The process of claim 18 wherein:
said gasoline boiling-point range material and said gaseous fraction are separated together and subjected to catalytic gasoline upgrading at catalytic gasoline upgrading conditions to form a catalytic gasoline upgrading product comprising catalytically upgraded gasoline and gaseous fraction and additionally comprising separating said gaseous product from said catalytically upgraded gasoline.

21. The process of claim 18 further comprising replacing catalyst in the reactor that has been attrited or decomposed through a make-up port disposed in the reactor.

* * * * *